United States Patent [19]

Masher

[11] 3,868,626

[45] Feb. 25, 1975

[54] DIGITAL LOOP DETECTOR SYSTEM

[75] Inventor: Dale P. Masher, Los Altos, Calif.

[73] Assignee: Gulf & Western Industries, Inc., New York, N.Y.

[22] Filed: July 9, 1973

[21] Appl. No.: 377,544

[52] U.S. Cl. .......... 340/38 L, 340/258 C

[51] Int. Cl. .......... G08g 1/01

[58] Field of Search .......... 340/38 C, 38 R, 258 R, 340/258 B, 258 C

[56] References Cited

UNITED STATES PATENTS 3,541,347 11/1970 Carmack .......... 340/258 C X

*Primary Examiner*—William C. Cooper

[57] ABSTRACT

A digital detecting system for creating an output signal when an electrically conductive object, such as a vehicle, comes within the field of effect of a loop. The system includes means for creating a pulse train having a frequency controlled primarily by the inductance of the loop, means for counting the pulses of the pulse train for a selected time interval to produce a count generally representative of the inductance of the loop during the time interval, means for creating a reference count, means for comparing the representative count with the reference count, and means for creating an output signal when the representative count differs from the reference count by at least a given amount in a given numerical direction, either above or below the reference count.

62 Claims, 38 Drawing Figures

| CYCLE TIME | PULSES TO INCREMENT |
|---|---|
| 200mS | 1 |
| 100mS | 2 |
| 50mS | 4 |

FIG. 5
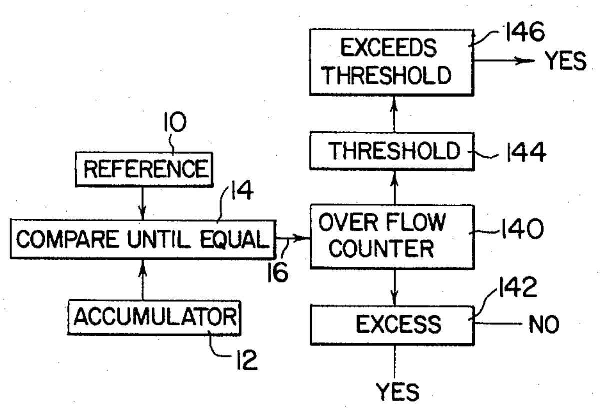
FIG. 6
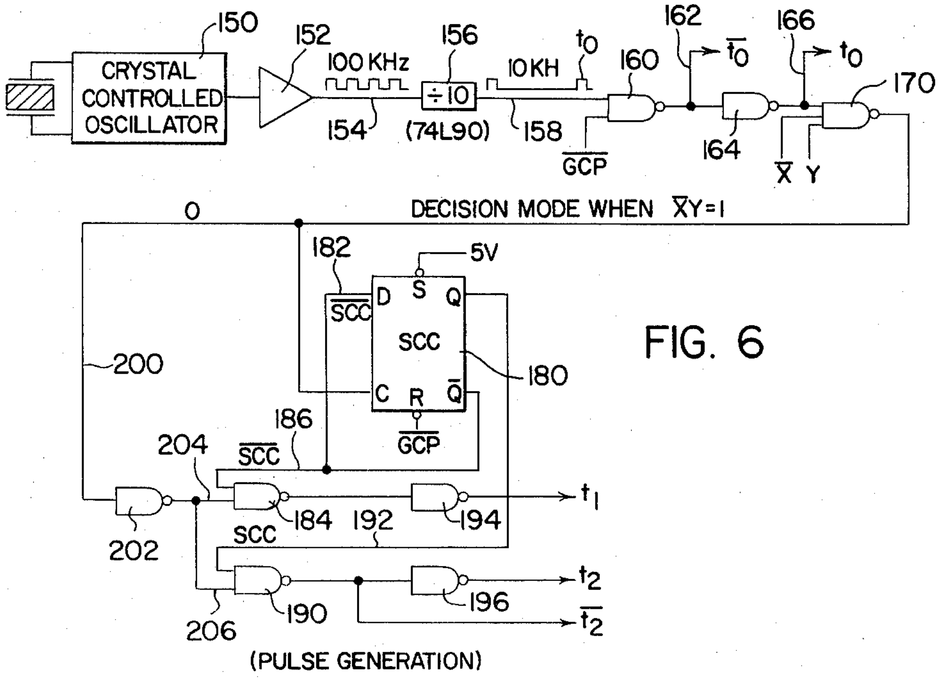
FIG. 6A
| TIME | SCC | $\overline{SCC}$ | $t_1$ | $t_2$ |
|---|---|---|---|---|
| INITIAL | 0 | 1 | 0 | 0 |
| $\overline{X}\cdot Y\cdot t_0=1$ | 0 | 1 | 1 | 0 |
| $t_0\rightarrow 0$ CLOCKS SCC | 1 | 0 | 0 | 0 |
| $\overline{X}\cdot Y\cdot t_0=1$ | 1 | 0 | 0 | 1 |
FIG. 6B
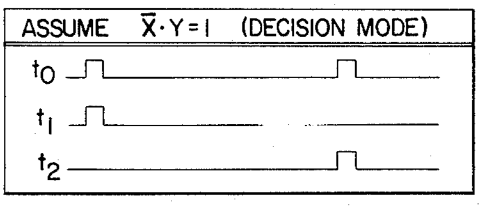

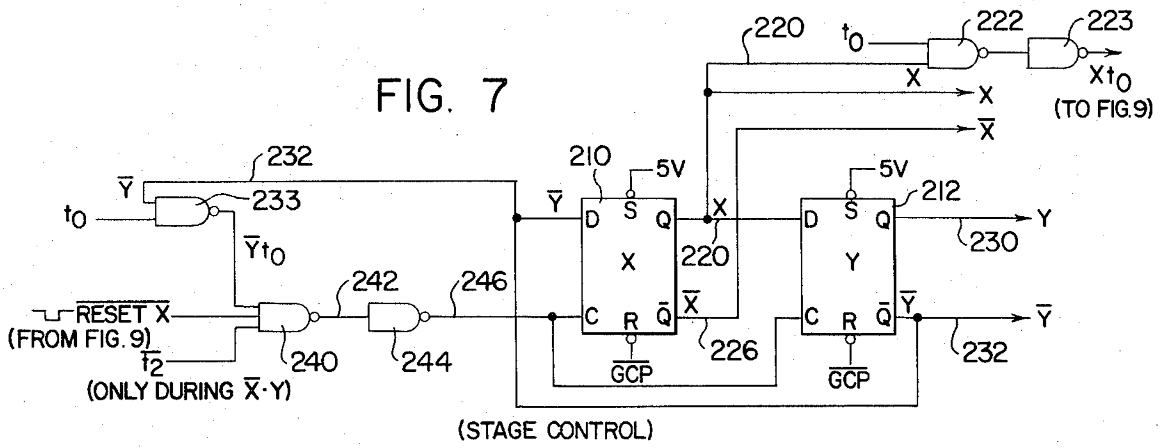
FIG. 7
| TIME (CONDITION) | X | $\bar{X}$ | Y | $\bar{Y}$ | STAGE |
|---|---|---|---|---|---|
| INITIAL CLEAR | 0 | 1 | 0 | 1 | $\bar{X}\bar{Y}$ TRANSITION |
| FIRST $t_0$ AFTER CLEAR GCP | 1 | 0 | 0 | 1 | $X\bar{Y}$ TRANSITION |
| SECOND $t_0$ | 1 | 0 | 1 | 0 | XY ACCUMULATE COUNT |
| HOLD WITH $\bar{Y}$= 0; NO $t_2$ | 1 | 0 | 1 | 0 | XY ACCUMULATE |
| $\overline{\text{RESET X}}$ END OF COUNT | 0 | 1 | 1 | 0 | $\bar{X}$Y DECISION (PROCESS) |
| $\bar{t}_2 \rightarrow 0$ | 0 | 1 | 0 | 1 | $\bar{X}\bar{Y}$ TRANSITION |
| $t_0 \rightarrow 1$ | 1 | 0 | 0 | 1 | $X\bar{Y}$ TRANSITION |
FIG. 7A
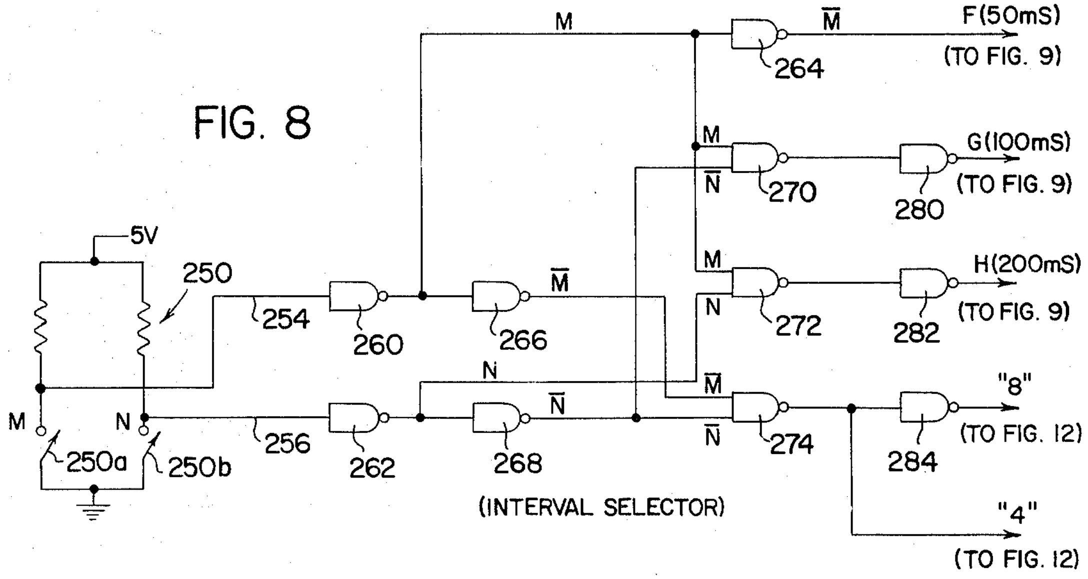
FIG. 8

| M | N | SWITCH CONDITION | INTERVAL | THRESHOLD |
|---|---|---|---|---|
| 0 | 0 | M OPEN<br>N OPEN | F(50mS) | "8" |
| 0 | 1 | M OPEN<br>N CLOSED | F(50mS) | "4" |
| 1 | 0 | M CLOSED<br>N OPEN | G(100mS) | "4" |
| 1 | 1 | M CLOSED<br>N CLOSED | H(200mS) | "4" |

| MODE | P | $\overline{P}$ |
|---|---|---|
| PULSE | 1 | 0 |
| PRESENCE | 0 | 1 |

OS (OUTPUT OFF) I (ENABLES)
OS (OUTPUT ON) O (RESETS)

(POSITIVE DRIFT ACCOMMODATION CIRCUIT)

(FORCED DRIFT CIRCUIT)

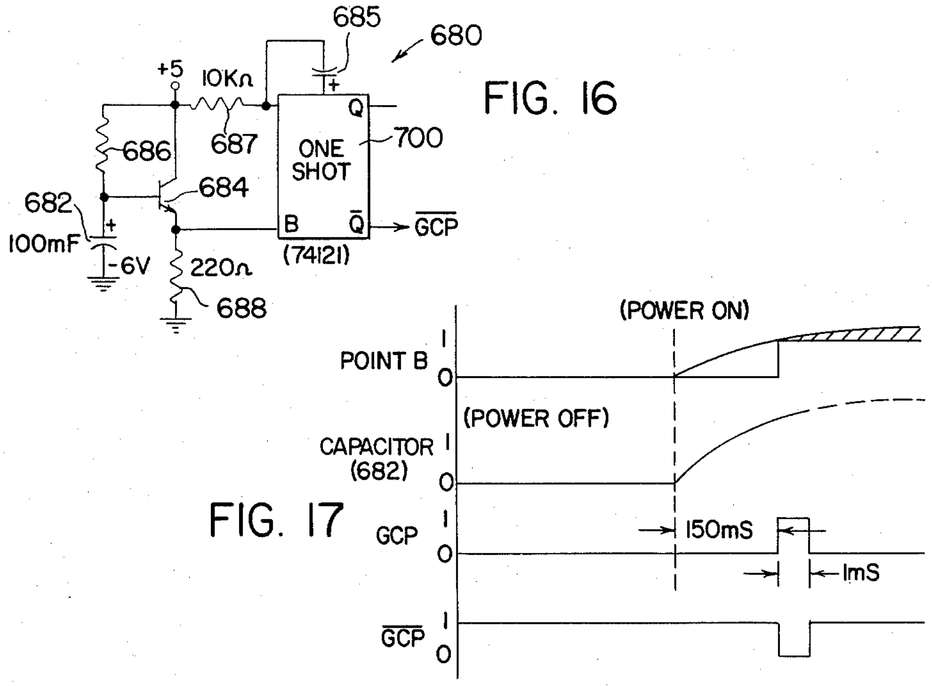
FIG. 16, FIG. 17
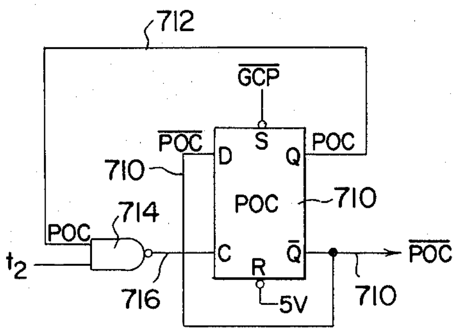
| CONDITION | POC | POC̄ |
|---|---|---|
| GCP 0 | 1 | 0 |
| FIRST $t_2$ | 0 | 1 |
| NEXT $t_2$ | 0 | 1 |
| n···$t_2$ | 0 | 1 |
| GCP → 0 | 1 | 0 |
| NEXT $t_2$ | 0 | 1 |
| n···$t_2$ | 0 | 1 |
FIG. 18
| GTC | DET | CONDITION |
|---|---|---|
| 0 | 0 | COUNT DOES NOT EXCEED REF |
| 1 | 0 | COUNT EXCEED REF BY LESS THAN THRESHOLD |
| 1 | 1 | COUNT EXCEED REF BY MORE THAN THRESHOLD |
FIG. 19

(DOWN COUNTING)

(COMPLEMENT)

(MEMORY)

DIGITAL LOOP DETECTOR SYSTEM

This invention relates to the art of loop detectors of the type used in detecting vehicles travelling along a roadway and more particularly to a digital loop detector system.

The invention is particularly applicable for use in detecting vehicles for traffic control purposes, and it will be described with particular reference thereto; however, the invention has broader applications and may be used for detecting electrically conductive objects, other than vehicles, as the objects are moving into and out of the field of effect of the loop. For instance, the invention could be used as a metal detector for security checks at air terminals.

In actuated and semi-actuated traffic control systems, vehicles must be detected for the purpose of controlling and modifying signalization at an intersection or group of intersections. Consequently, a great number of detectors have been developed for the purpose of detecting a vehicle and recording its presence within a given roadway area. These detectors have taken a variety of different forms. However, magnetic, sonar, radar, pressure tredles and induction loop devices have been used most often for detection of vehicles in a signalization system. One of the more popular types of detectors is the induction loop detector wherein a large loop is embedded within or adjacent the roadway to create a flux field, which defines the vehicle detection area. As the vehicle comes within the detection field of the loop, a signal is created which indicates the presence of the vehicle. The present invention relates to an improvement in this general type of vehicle detector.

In the past, vehicle loop detectors have generally included an oscillator controlled by the loop and means for detecting a vehicle by changes in the phase of the output oscillations or variations in the amplitude of the output oscillations. These parameters vary according to the presence of an electrically conductive object, as a vehicle, in the field of effect of the loop adjacent the roadway. Such systems have generally required analog peripheral circuitry to provide the output signal for recording the detection of a vehicle. In addition, relatively complex circuitry was needed to allow operation of a loop detector when a vehicle became disabled or parked within the field of the loop. In many cases, a vehicle remaining within the field of the loop would cause serious difficulties in the analog output and the general operation of prior loop detectors.

The present invention is directed toward an improved loop detector which employs digital concepts and the frequency of an oscillator controlled essentially by a tank circuit including an induction loop mounted adjacent a roadway. By operating from the frequency of an oscillator instead of the phase or amplitude of the oscillator, a relatively stable detecting system is created. In addition, by using the frequency of an oscillator controlled by the roadway loop and digital logic concepts, a relatively small inexpensive loop detector system is possible. In addition, the invention provides a convenient arrangement for allowing operation of the detector system with a vehicle parked or stalled within the field of effect of the loop.

In accordance with the invention, there is provided a digital detecting system including means for creating a pulse train having a frequency controlled primarily by the inductance of the roadway loop. Of course, the frequency is controlled by other parameters of the oscillation; however, the basic changing parameter is the loop inductance. The invention also includes means for counting the pulses of the pulse train for a selected time interval to produce a count representative of the inductance of the loop during a specific time interval, means for creating a reference count, and means for comparing the representative count with the reference count. An output signal is created when the representative count differs from the reference count by a given amount that is indicative of a vehicle entering the detection field of the loop.

In accordance with the invention, the time interval during which a representative count is taken is repeated in rapid succession. During each interval the representative count is compared with the reference count to produce an output signal where there is a vehicle detected by the loop. When a vehicle is stalled or parked within the field of effect of the loop, an initial detection signal is created. However, in accordance with one aspect of the invention, the reference count is incremented so that ultimately the reference count is increased to a count level that compensates for the increased count caused by the stalled or parked vehicle. At this time, the digital detector system operates at a reference level that eliminates consideration of the vehicle. When the vehicle ultimately departs from the detection field, the reference count is shifted down to the normal reference count for detection of other vehicles.

In accordance with another aspect of the invention, the reference count is created by using a count accumulated during a prior counting interval. Consequently, the reference count has a relationship to the operation of the loop oscillator and is varied to compensate for frequency drifts of the loop oscillator. In accordance with this aspect, a count accumulated during one counting interval is gated into a reference register for use as the reference count during a subsequent counting interval. During normal operation, the count accumulated during a counting interval is gated to the reference register for use in the next counting interval. To increase the stability and eliminate hunting with slight drifts in the count during a counting interval, there is provided, in the invention, circuits for temporarily preventing the gating of the accumulated count to the reference register during certain periods when the accumulated count shows that changes in frequency are occurring at a rate which requires special logic analysis. This condition occurs when a vehicle is first detected and it is not known whether the vehicle is stalled or parked in the detection field, and when there is a slight increase in frequency and it is not known whether the increase is by an approaching vehicle or a drift in the operating frequency.

The primary object of the present invention is the provision of a loop detecting system of the type used in detecting vehicles travelling along a roadway, which system employs digital logic and counts the pulses of an oscillator controlled by a loop adjacent the roadway.

Another object of the present invention is the provision of a loop detector which uses the output frequency of the loop oscillator for determining a detection of a vehicle by a loop adjacent a roadway.

Another object of the present invention is to provide a system as described above which compensates for drift in the parameters of the loop, the loop tank circuit and the total oscillator driving the loop tank circuit.

Yet another object of the present invention is the provision of a system as described above which uses the parameters of the loop circuit and its associated oscillator for controlling the operating datum of the system.

Yet another object of the present invention is the provision of a system which includes the capabilities of adjusting for vehicles stalled or parked in a position with respect to the loop which causes a detection by the system, so that the system can operate under such conditions.

Another object of the present invention is the provision of a digital loop detector of the type described above which can be constructed from a LSI chip using MOS technology. In this manner, a relatively small electrical component can be used with external controls to accomplish a detecting system with high reliability, relatively low cost, and in a relatively small space.

These and other objects and advantages will become apparent from the following description taken together with the accompanying drawings in which:

FIG. 5 is a block diagram illustrating, schematically, the comparing function of the preferred embodiment of the present invention;

FIG. 6 is a combined block and logic diagram illustrating the pulse generation circuit employed in the preferred embodiment of the invention;

FIG. 6A is a truth table illustrating the basic operation of a portion of the diagram shown in FIG. 6;

FIG. 6B is a pulse chart showing the timing or synchronizing pulses used in the preferred embodiment of the present invention and created by the circuit illustrated in FIG. 6;

FIG. 7 is a logic diagram illustrating the stage control of the preferred embodiment of the invention for shifting the digital detecting system between a counting interval and a decision or processing interval;

FIG. 7A is a truth table illustrating operating characteristics of the circuit shown in FIG. 7;

FIG. 8 is a combined wiring network and logic diagram illustrating the circuit used in the preferred embodiment of the invention for selecting the timing or counting interval to be used during the operation of the detecting system;

FIG. 16 is a circuit for creating the general clearance pulse which is developed when the detecting system is first actuated;

FIG. 17 is a series of voltage charts illustrating the operating characteristic of the circuit shown in FIG. 16;

FIG. 18 is a logic diagram and truth table showing the operation of the power on control employed in accordance with the illustrated embodiment of the invention;

FIG. 19 is a truth table showing certain operating characteristics of the preferred embodiment of the present invention; and, FIGS. 20–28 are schematic block diagrams illustrating certain modifications in the preferred embodiment of the present invention.

Figure 1:
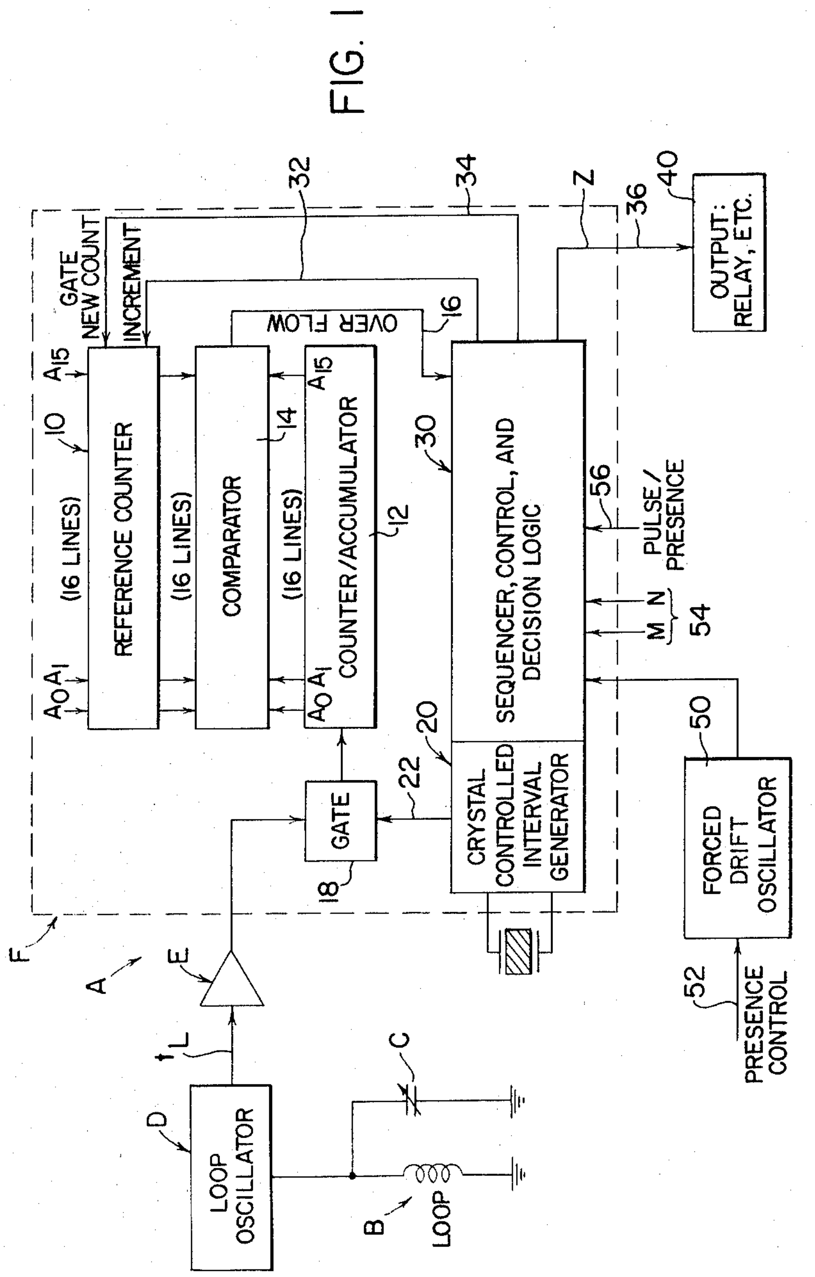
FIG. 1 is a schematic block diagram illustrating the general operation of the preferred embodiment of the present invention.

Before discussing the details of the preferred embodiment of the present invention, certain concepts employed in the invention and in the preferred embodiment thereof will be explained. This explanation will be of assistance in considering the preferred embodiment and the various circuitry and diagrams for accomplishing certain primary functions of the invention.

LOOP OSCILLATOR

To detect vehicles travelling along a roadway, there is provided an induction loop within or adjacent the roadway. This loop forms a tank circuit with a capacitor or capacitors. The capacitor can be adjusted to change the resonant frequency of the tank circuit. The resonant frequency of the tank circuit controls the output frequency of a loop oscillator to produce a pulse train $t_L$. Consequently, the output frequency of the loop oscillator is primarily determined by the characteristics of the controlling tank circuit. The oscillator may have a variety of different designs; however, in accordance with the preferred embodiment of the invention the nominal frequency of the oscillator is adjusted to approximately 200,000 Hertz. When a vehicle comes within the field of effect of the loop, the output frequency of the oscillator changes in a known manner. In the preferred embodiment, the frequency increases upon the presence of a vehicle in the immediate vicinity of the loop.

A detecting system constructed in accordance with the present invention, is controlled by the output frequency of the loop oscillator. Although the exact output frequency is controlled by a variety of parameters, such as the inductive reactance of the loop, the capacitive reactance of the capacitor in the tank circuit, and the other components forming the oscillator, the invention is best understood by considering that only the changes caused by variations in the inductance of the loop in the tank circuit are of primary concern. The other parameters generally cause only slight drifts in the output frequency. Any slight change or drift in the frequency is noted and offset by certain circuits employed in the preferred embodiment of the invention.

COUNTING AND COMPARING

In accordance with the invention, the pulses of the pulse train coming from the loop oscillator are counted during closely controlled time intervals referred to as the "counting intervals." These counting intervals are created in rapid succession and are separated by short time periods during which decisions are made based upon the counts accumulated from the pulse train during the immediately preceding counting interval. Since a counting interval has a known time, changes in the frequency results in changes in the counts accumulated during the constant time, counting interval. Consequently, the count is representative of the operating condition of the loop oscillator. The basic change in this condition reflected by a change in the oscillation frequency is caused by electrically conductive objects, such as vehicles, entering into the vicinity of the detector loop. Other changes or drifts in frequency are minor and occur over long periods of time. The number of counts accumulated during a given counting interval is thus indicative of whether or not an object is in the vicinity of the loop.

In accordance with one aspect of the invention, this accumulated count for a given interval is compared with a reference count. Generally, the reference count for a given counting interval is the count accumulated in the immediately preceding counting interval. To accomplish this, at the end of a counting interval, the decision or logic operating state gates the accumulated count into a reference register for use in the next counting interval. In this manner, the reference count generally represents a current operating condition of the loop oscillator. If there is no change in the output frequency of the loop oscillator from one counting interval to the next, the reference count remains the same. Under special circumstances the reference count is not updated after each counting interval. Basically, the reference count is held at least temporarily when there is a detection or when there is a slight up drift in the output frequency. These features will be explained later.

By using the accumulated count for the reference count in successive counting intervals, any slight drift in the oscillator is transferred to the reference counter or register as a new reference count. Consequently, false detections or a failure to detect are avoided. In addition, by updating the reference count to correspond with existing oscillator conditions, slight variations in the operating parameters of the loop oscillator and its associated circuitry including the tank circuit are offset.

In accordance with the preferred embodiment of the invention, the timing interval may be selected as 50 mS, 100 mS, or 200 mS. The decision mode between the interval is performed in a gap of approximately 0.4 mS between adjacent counting intervals. Consequently, the counting intervals are closely spaced and relatively short. The sensitivity of the system is increased by using longer timing or counting intervals. For instance, the timing or counting interval of 200 mS will produce a count differential four times larger than the differential produced during a 50 mS counting interval for the same oscillator conditions. Consequently, longer intervals are useful for greater sensitivity. However, the shorter intervals produce a more rapid response to the changing conditions of the output pulse train from the loop oscillator.

To control the detecting system, the count accumulated during a counting interval is compared with the reference count existing during that interval. If a differential exist, the frequency of the loop oscillator has changed. A change of sufficient magnitude indicates that a vehicle has entered the detection field of the induction loop. Smaller changes could mean that a vehicle is approaching the loop or that other conditions have caused slight changes in the oscillator output. These conditions are processed in accordance with further features to be explained later.

It is appreciated that various concepts could be used to compare the frequency of the oscillator at a given time with an appropriately established reference to identify, by comparison, the existence of a detected vehicle. The counting operation is best suited to digital operation and can best be incorporated into a LSI chip of the MOS type.

OUTPUT RESPONSE FEATURE

In accordance with one aspect of the invention, the output of the detector system is actuated when the count accumulated during a counting interval is different from the reference count by a preselected number of counts referred to as the threshold number. In the preferred embodiment, two threshold numbers, 4 and 8, can be used. The sensitivity is increased by a reduction in the threshold number. Various numbers could be used as the threshold number without departing from this aspect of the invention. Since a vehicle causes a rapid change in frequency, the accumulated counts also change rapidly. By using a threshold of 4 or 8, a vehicle is detected quickly upon entering the field of the induction loop. The output remains controlled as long as the accumulated count for succesive counting intervals exceeds the reference count by the threshold. While the output is set, the accumulated count in a counting interval is not inserted into the reference counter to be used as a reference count. If the reference count were updated to read and use the high count differential caused by a detection, the next counting interval would not continue to detect the vehicle in the field of the loop.

POSITIVE DRIFT FEATURE

During the operation of the preferred embodiment of the detector system, the output frequency of the pulse train from the loop oscillator may shift in the direction of a detection without reaching the threshold number in a given counting interval. This slight shift can be caused by various conditions. For instance, a vehicle may be approaching during a timing interval, a small electrically conductive object may be in the detecting field, or the parameters of the loop, tank circuit or oscillator itself may change. The positive drift feature of the present invention comes into action when there is a slight upward increase in the count during a counting interval. In accordance with the aspect of the present invention referred to as the "positive drift" feature, the system does not update the reference count for a number of successive counting intervals. If the count differential remains less than the threshold number during these subsequent intervals, a slow and/or small vehicle is not approaching; therefore, the reference count is updated to the new level being accumulated.

In accordance with the preferred embodiment, the reference count is not immediately updated to the accumulated count. In other words, when the accumulated count differs from the reference count by less than the threshold number, the next decision or processing stage does not produce a new reference count corresponding to the prior accumulated count. To accomplish this, a positive drift counter delays the entry of the new reference count. If the increased condition continues for a series of counting intervals, the positive drift counter will ultimately time out. When this happens, the existing increased accumulated count is then inserted into the reference counter. Consequently, if an increase in the count occurs for a number of successive counting intervals, a new reference count is established. This reference count is the higher accumulated count. In this manner, an approaching vehicle causing a slight increase in the frequency will not cause an immediate upshift in the reference count. If this were to occur, it is possible that the upshift of the reference count would be progressive and a vehicle would not be detected. Thus, there is a delay before increasing the reference count. If a vehicle is detected during this delay, the threshold is exceeded and the output is set. Slight somewhat permanent changes in counts toward the threshold number, but less than this number, are tracked by updating the reference count, after a time determined by the positive drift feature.

FORCED DRIFT FEATURE

In accordance with one aspect of the invention, there is provided circuitry for adjusting the detector when a vehicle is stalled or parked in a position which causes a detection by the system. This feature is generally known as the "forced drift" feature since it produces a fictitious drift in the reference count during prolonged output indications. As previously mentioned, when a vehicle enters the direction field of the loop, the frequency in the output train from the loop oscillator changes to a value differing from the reference count by an amount greater than the selected threshold number. This sets the output indicating a vehicle detection. If this vehicle remains in the detection field for a prolonged time, the system remains in a detection state and cannot detect subsequent vehicles. To allow detection of subsequent vehicles, the forced drift feature provides for slow incrementing of the reference count toward the accumulated count. In other words, when the output is set, which indicates a detection, the reference count is slowly changed toward the accumulated count. As previously mentioned, the reference count is not up-dated to the accumulated count during a period of detection. The slight changing of the reference count continues until the accumulated count does not differ from the incremented reference count by the threshold number. As soon as this occurs, the accumulated count during the counting interval is immediately inserted as a new reference count. This establishes a new reference count which is at the level determined by the vehicle remaining within the detection field of the loop. The detecting system then operates with this new increased reference count. Subsequent vehicles entering the field will thus be detected in a manner previously described. By shifting immediately to the new reference count corresponding to the count caused by the stalled or parked vehicle, there is no hunting of the system. The new reference is basically the detected count level existing in the system; therefore, slight variations in accumulated count after a new reference count has been inserted will not exceed this new higher reference by the threshold number. Consequently, a controlled action shifts the system into a condition which ignores, or "forgets" the parked or stalled vehicle.

GENERAL DESCRIPTION OF THE PREFERRED EMBODIMENT

In accordance with the preferred embodiment of the invention as shown in FIG. 1, the digital loop detector system A includes a loop B adapted to be positioned in or adjacent to a roadway, in accordance with normal traffic control practice, an adjustable capacitor C in parallel with loop B, and a loop oscillator D. The oscillator D is controlled by the tank circuit including loop B and capacitor C, and has an output frequency determined primarily by the resonant frequency of this tank circuit. The loop B is positioned adjacent a roadway and preferable in a single lane of a roadway so that the magnetic flux field created by the loop will be affected by a vehicle entering the field and on the lane. The inductance of loop B will be changed by a vehicle or other conductive object to change the frequency of loop oscillator D. This change in frequency, when caused by a vehicle is a "detection" to be processed by system A.

In accordance with the preferred embodiment of the invention, the frequency of oscillator D is adjusted to a normal frequency of approximately 200,000 Hertz. The construction of the oscillator does not form a part of the invention and various oscillators could be used for creating a pulse train output having a frequency or rate determined primarily by the inductance of loop B and the adjusted value of capacitor C. By using the present invention, slow drifts in the frequency of the oscillator can be accommodated; therefore, a highly stable loop oscillator is not a necessity. A squaring amplifier E is connected to the oscillator D and squares the output of oscillator D to produce a pulse train $t_L$ which has a frequency controlled primarily by the inductance of loop B and the adjusted value of capacitor C. As the inductance of loop B changes, the frequency $t_L$ changes accordingly. Changes in the frequency of $t_L$ are used to control the digital loop detector system A, which includes a processing circuit F surrounded by a dashed line. The processing circuit contains a major portion of the circuitry employed in accordance with the preferred embodiment of the invention and could be formed into an LSI chip using MOS technology.

In accordance with the preferred embodiment of the invention, the processing circuit F includes a reference register or counter 10, a counter or accumulator 12, and a comparator 14 for comparing the counts in accumulator 12 with the counts in the reference counter. The reference register 10 provides a signal, i.e., count, which is used as a standard or reference count against which a signal, i.e., count, in accumulator 12 is compared by comparator 14. The pulse train $t_L$ is gated to accumulator 12 by a gate 18 controlled by a crystal controlled interval generator 20 through schematically illustrated line 22. The counting interval during which pulse train $t_L$ is being counted by counter or accumulator 12 is controlled by interval generator 20. When gate 18 is opened, a train of pulses from amplifier E passes into accumulator 12. When the gate is closed the train does not affect the accumulator. The interval during which gate 18 is open is the "counting" or "timing" interval. The counting interval occurs repetitively at a substantially constant time rate determined by crystal controlled interval generator 20. In accordance with the preferred embodiment of the invention, the substantially constant counting interval may be selected to be 50 mS, 100 mS or 200 mS. The sequence control and decision logic circuits 30 are controlled by the counter 10, counter 12 and comparator 14 after each counting interval making decision based upon the number of counts accumulated in counter 12 during each counting interval and the relationship with the count in reference register 10. Line 32 represents the function of incrementing the reference counter by a unit change, such as 1 for example, to change the reference count or signal to be compared with the count or signal being accumulated in counter 12. Line 34 represents the function of gating a completely new count into reference counter 10 for comparison with the accumulated count in counter 12 during a counting interval. Sequence, control and decision logic circuit 30 includes an output line 36, labeled Z, for controlling the output of the digital loop detector. The output 40 may be a relay, transistor switching circuit, or optical coupled output, to name only a few. The particular type of output is not a part of the invention, since various outputs could be used with the digital loop detector system A as will hereinafter become apparent. The circuit 30 is controlled externally by a forced drift oscillator 50 to give detector A the capability of "forgetting" a vehicle remaining in the field of loop B for a prolonged time interval. The output of the forced drift oscillator 50 can be adjusted, as represented by line 52, so as to change the "forgetting" time for the digital detector of a vehicle in the field of influence of loop B. The interval of the interval generator 20, i.e., the time period that $t_L$ is gated into the counter during each cycle, is selected by logic on lines 54, designated M. N. By changing the logic on these lines, the counting interval and sensitivity of system A can be adjusted externally of circuit 30. To change the system A from a "pulse" mode to a "presence" mode of operation, there is provided a line 56 which is controlled by a manually adjusted switch to shift the system A into one of these types of output operations. In the "pulse" mode, a generally uniform pulse is created in output line Z for each detection. When in the "presence" mode, the output Z is activated for the time that a vehicle is being detected and before it is forgotten by the forced drift feature using oscillator 50.

Figure 2:
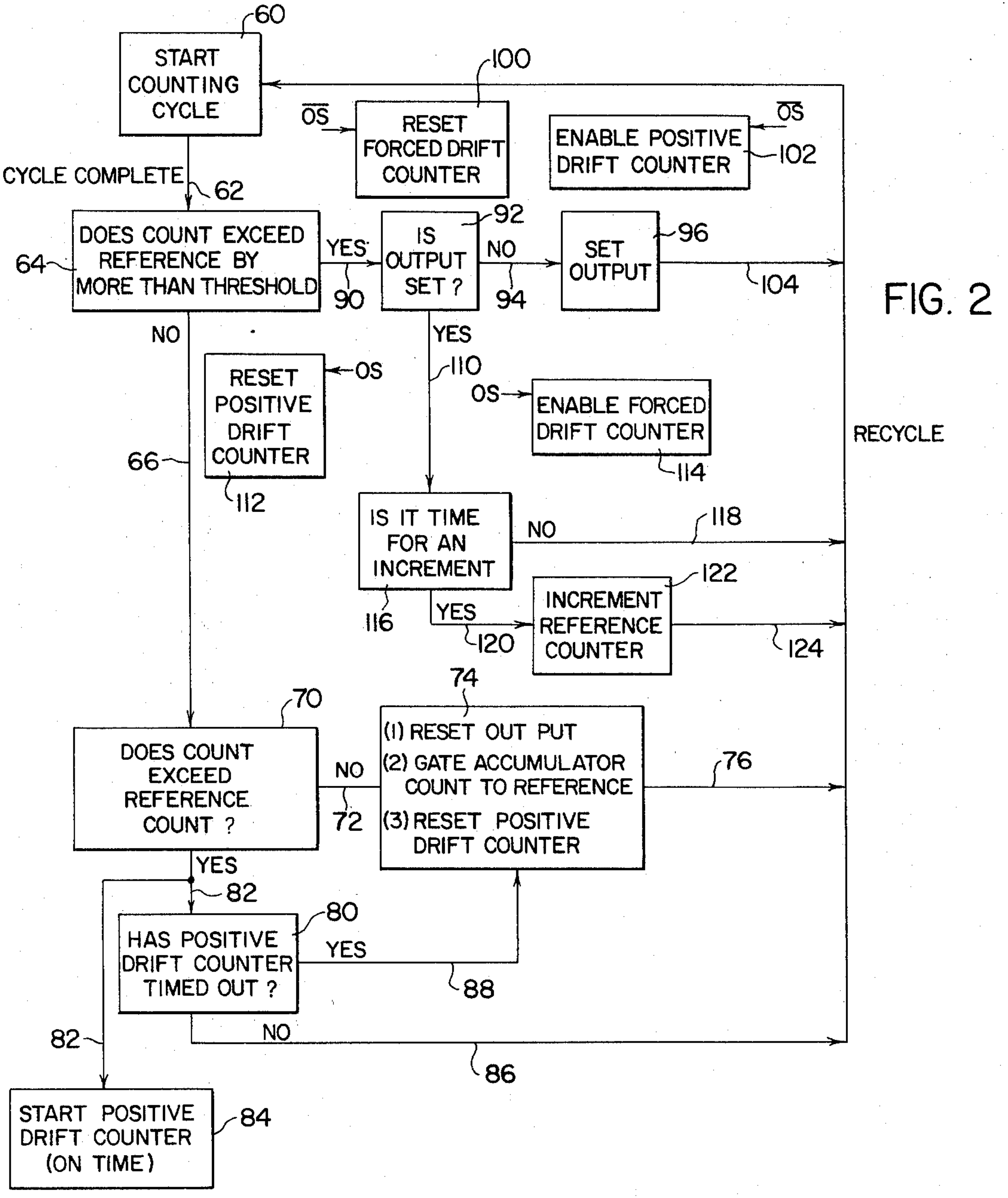
FIG. 2 is a logic diagram and flow chart illustrating the basic logic steps performed by the preferred embodiment of the present invention.

FIG. 2 is a schematic block diagram illustrating the general logic concepts and operating characteristics of the sequencer, control and design logic circuit 30. After a counting interval, the logic or function steps of FIG. 2 are performed in a decision interval. Block 60 represents the step of starting the counting cycle or interval. During this interval, the counts in the pulse train $t_L$ are gated into the accumulator 12 for comparison with the count in reference counter 10. After the count has been accumulated for the desired time, the steps of the flow chart shown in FIG. 2 are followed. The decision process proceeds by line 62 to block 64. For the purpose of explaining the block diagram of FIG. 2, the first example will be a condition wherein the count accumulated within accumulator 12 is equal to or less than the count within the reference counter. This happens when there is no detection of a vehicle by loop B and when there is no upward drift of the oscillator D. Block 64 determines whether or not the accumulated count in accumulator 12 has exceeded the reference by the threshold number, which is a selected number created when a vehicle is present in the field of loop B. Under the assumed set of conditions, it has not; therefore, line 66 is actuated. Line 66 now proceeds through the function flow chart of FIG. 2 to block 70. The decision function of this block is whether the reference count has been exceeded. In the assumed set of conditions, it has not; therefore, line 72 is actuated. This controls block 74 which has three functions. Since there is a low accumulated count, or at least a count equal to the reference count, there should be no output indication. Thus, the output is reset to indicate no vehicle detection. At the same time, the reference counter is gated by line 34 of FIG. 1 to receive the accumulated count within the accumulator 12. If the count in the accumulator is the same as the reference count, the gating operation does not change the reference count. However, if the count happens to be lower than the reference count, the lower count is then gated into the reference counter. The comparison during the next counting interval is made with a lower reference count. Block 74 also resets the positive drift counter having a function to be explained later.

After the functions given in block 74 have been completed, the counting interval is repeated, as indicated by line 76. Again, the accumulated count is compared with the reference count and an action taken according to this comparison. The time between counting intervals or cycles, in accordance with the preferred embodiment of the invention, is approximately 0.4 mS. Consequently, the processing or decision step takes place quite rapidly, and system A is normally functioning in the counting interval which, in the preferred embodiment, is 50 mS, 100 mS or 200 mS.

In the next example, the accumulated count in accumulator 12 differs from the reference count by a number less than the threshold number. This is a relatively small increase in the accumulated count which can occur when the parameters of oscillator D or of loop B change causing a slight drift or change in frequency, a missed count is experienced, a vehicle approaches the loop or a metal object, having an effect less than a vehicle, enters the field of influence of loop B. When such a slight increase in the accumulated count is experienced, the logic path described above in the first example is repeated to block 70. At that block, there is an indication that the count does exceed the reference count; therefore, line 82 is energized. This immediately starts the positive drift counter on the first counting interval having this condition. This starts the positive drift feature explained before. The reference count is not changed after the counting intervals until the positive drift counter times out. During subsequent counting intervals with the increased count, line 82 determines whether or not the positive drift counter has timed out. Assuming that a slight increase in the accumulated count has occurred for only a short time, the positive drift counter will not be timed out; therefore, the counting interval will be repeated as indicated by line 86. The condition of the positive drift counter will be reviewed after each subsequent counting interval. If a subsequent interval has an accumulated count that does not exceed the reference count, line 72 becomes energized and the positive drift counter is reset, i.e., stopped. In other words, if the slight increase in accumulated counts during a timing interval disappears during a subsequent interval and before the positive drift counter times out, block 74 is actuated which resets the positive drift counter for operation during the next experience of a slight increase in the accumulated count.

Assume now that the accumulated count remains at a slight increase for an interval set by the positive drift counter. In this situation, line 88 is actuated after the positive drift counter has timed out. This gates the new count into the reference counter and again resets the positive drift counter as indicated in logic block 74. Consequently, the interval timed by the positive drift counter is a permissive period during which there can be a slight increase in the accumulated count without changing the reference count. If this slight increase remains for a prolonged period, the slightly increased count in the accumulator appears somewhat permanent; therefore, the reference counter is updated to compensate for this change in operating characteristics of oscillator D and/or loop B. Of course, slight decreases in the accumulated count cause immediate gating of the accumulated count into the reference register 10, as previously discussed. The positive drift feature assures detection of a vehicle entering the detection field by holding the reference count to an existing level for a time required for a vehicle to enter the detection field an amount causing detection.

The next example is when a vehicle enters the field of effect of loop B. When a conductive mass, such as a vehicle, enters the field of influence of loop B, the inductance of the loop is changed, thereby changing the output frequency of oscillator D. This increase causes an accumulated count substantially over the threshold number. In some instances a detection may result in 1,000 counts over the reference count, especially when the counting interval is 200 mS and the vehicle is quite large. Smaller vehicles and the shorter intervals result in lower count increases when the vehicle is directly in the field of influence of loop B. When an increased accumulated count caused by a detection occurs, the accumulated count exceeds the reference count by more than the selected threshold. The logic block 64 indicates an affirmative answer in line 90. System A then determines whether or not the output has been previously set. This is indicated by block 92. If the output has not been set, this indicates that the detection has just occurred and has just been noted by the increase in the accumulated count. Line 94 then takes effect and sets the output as indicated by block 96. When the output is not set, $\overline{OS}$, which is the $\overline{Q}$ output of the output flip-flop to be described later, is a logic 1. As represented by block 100, 102, a logic 1 in the $\overline{OS}$ line resets the forced drift counter and enables the positive drift counter. These functions will be considered during a detailed description of the circuits employed in the preferred embodiment. After the output has been set, the decision interval is terminated as indicated by line 104, and the counting interval is repeated. Since a vehicle is usually detected for a series of successive intervals, the next decision interval will find the output set. Consequently, line 110 will be actuated and the OS line will be a logic 1. The OS line resets the positive drift counter as indicated by block 112 and enables the forced drift counter as indicated by block 114. The purpose of this counter is to increment the reference counter 10 by line 32, as shown in FIG. 1. Incrementing the counter is used to "forget" a vehicle being detected for an extended time. If a vehicle stops in the field of influence of loop B and remains there for a sufficient time, the forced drift counter will time out and allow incrementing of the reference counter. After a sufficient number of increments, the count in the reference counter will be readjusted to a different value and will offset the increased accumulated count caused by a stationary vehicle. In this manner, the digital system A will function even though a vehicle is parked in the field of influence of loop B. In addition, if the vehicle breaks down while actuating system A, it will be forgotten eventually, and system A will continue to function to detect subsequent vehicles. Block 116 indicates the logic step of allowing the incrementing of the reference counter. If it is not time for an increment, the decision interval is terminated as indicated by line 118. This cycling of the logic in FIG. 2 continues until either the vehicle is no longer detected, which will de-energize line 90 and energize line 66, or until the forced drift counter has timed out. When this has happened, line 120 is actuated to increment the reference counter by a number, such as 1, as illustrated by block 122. After the incrementing of reference counter, the decision function is continued as indicated by line 124. Assuming that a vehicle is parked or otherwise remains within the field of inlfuence of loop B for an extended period of time, periodically block 122 causes incrementing of the reference counter. This continues until the differential between the incremented reference counter count and the accumulated count in accumulator 12 is less than the threshold. At this time, the vehicle is "forgotten" and a new count is then inserted into the reference counter 10 so that the reference counter now includes a new reference based upon the existence of a vehicle. If the vehicles leaves, the accumulated count will not exceed the reference count and threshold. A circuit to be discussed later immediately enters the new count into the reference counter 10 to establish a new operating condition. The forced drift counter provides a controlled manner of gradually "forgetting" the existence of a detected vehicle. The time of this "forgetting" operation is sufficiently long so that a vehicle in normal traffic will leave the detection field before the reference register is incremented to "forget" the vehicle.

Figure 3:
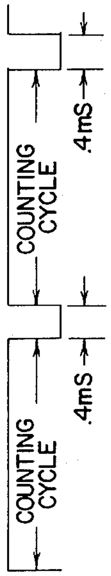
FIG. 3 is a time base pulse graph illustrating the relationship between adjacent counting cycles or intervals in the preferred embodiment of the present invention.
Figure 4:
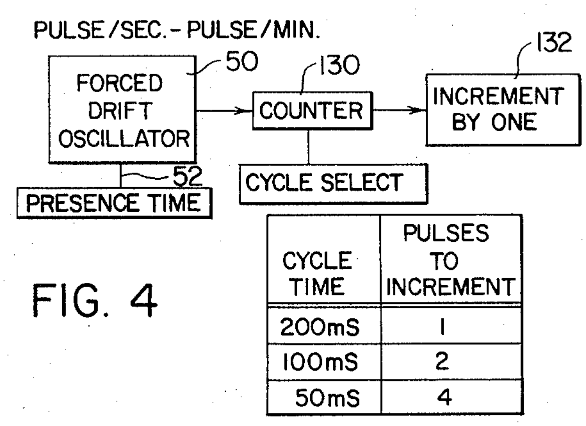
FIG. 4 is a block diagram and function chart illustrating, schematically, the forced drift feature employed for incrementing the reference count to compensate for a vehicle or other detected object stalled, placed or parked within the detection field of a detector constructed in accordance with the preferred embodiment of the present invention.

Certain basic operating characteristics of digital loop detector system A are illustrated in FIGS. 3, 4, and 5. These characteristics will be helpful in understanding the circuits disclosed later. FIG. 3 is a chart representative of the relationship between the counting cycle or interval and the logic processing or decision stage of operation. The counting interval or cycle may have various appropriate lengths of time which, in accordance with the preferred embodiment of the invention, are either 50 mS, 100 mS or 200 mS. Between each of the counting intervals, the accumulated count is processed in accordance with its relationship to the reference count in the reference counter. During the counting interval, a continuous comparison is made with the count in the reference counter. When these two counts are equal, an overflow signal occurs in line 16 which actuates an overflow circuit to count the excess of the accumulated count over the reference count. During the counting interval certain flip-flops and gates may be reset, enabled or inhibited according to the accumulated count. In other words, flip-flops can be set when the accumulated count exceeds the reference count and when the excess count is greater than the threshold. All of these functions will be explained when the logic circuitry of the preferred embodiment is discussed.

In FIG. 4, there is illustrated a schematic representation of the forced drift counter 130 which is controlled by the force drift oscillator 50. Counter 130 counts the pulses from oscillator 50 to increment the reference counter for forgetting a detected vehicle. In accordance with the illustrated chart, the cycle selection for the counting interval determines when the reference counter is incremented by 1. When the counting interval is 200 mS, each pulse of the forced drift oscillator 50 causes an increment of the reference counter. when the interval is 100 mS, two pulses of the forced drift oscillator are required before there is an increment of 1 in the reference counter. In a similar manner, when the counting interval for the counting cycle is 50 mS, four pulses of the forced drift oscillator are required before there is a single increment of the reference counter. The reason for this variation in incrementing by the oscillator is due to the difference in the general magnitude of the counts during various intervals. During the 200 mS interval, the count to be accumulated is generally four times as great as the count accumulated during a 50 mS timing interval. Consequently, during a vehicle detection of a given vehicle, the accumulated count exceeds the threshold by a larger number and requires more rapid incrementing to "forget" the vehicle. This difference in incrementing produces a somewhat similar time for "forgetting" a vehicle in the various modes of operation of the digital detecting system A. The "forgetting" time is controlled by the external adjustable presence time device.

Referring now to FIG. 5, a schematic representation of the comparing function is illustrated. After the accumulated count in accumulator 12 equals the reference count within the reference counter 10, an overflow occurs in line 16. This records the fact that the reference count has been exceeded and starts the overflow counter. Each additional count in accumulator 12 is registered as a count in the overflow counter 140. Actuation of the overflow counter is indicated by block 142, having an output representative of either an overflow or no overflow. As the overflow counter continues during the counting interval, the number of overflow counts are compared with the threshold number. In the preferred embodiment of the invention, the threshold number is either four or eight counts. When the threshold number is reached, as represented by block 144, the counting interval has no additional effect upon the logic circuits. The excess over the threshold, represented by block 146 does not perform a control function. This is evidenced by the flow chart in FIG. 2 which is responsive to only whether or not the accumulated count has exceeded the threshold number. The functions illustrated in FIG. 5 are performed during the counting interval and the output of the various devices illustrated are used during the next processing or decision stage.

GENERAL DISCUSSION OF LOGIC CIRCUITS

FIGS. 6–19 show the logic circuits, associated circuitry, and their functions as used in the preferred embodiment of the present invention to perform the sequence of logic functions schematically illustrated in the flow chart of FIG. 2. In these logic circuits, certain signals are illustrated as inputs and outputs at the various figures. The same symbols are used in each of the figures so that the interconnections of the logic circuits and the inter-control of the logic circuits can be appreciated with respect to the control signals. In describing the logic circuits, it will be necessary to describe the use of certain signals or logic states prior to a detailed description of the logic circuits for developing these signals or states. When all figures are to be considered together, the total operation of all circuits becomes quite apparent.

GENERATION OF CONTROL CLOCKING PULSES

Referring now more specifically to FIG. 6, there is illustrated a logic circuit for creating the general control pulses $t_0$, $t_1$ and $t_2$. These pulses are used throughout the various logic diagrams or circuits for sequencing and synchronizing these circuits with respect to the clocking pulses. This figure shows part of the circuitry included in the crystal controlled interval generator 20 of FIG. 1. A crystal controlled oscillator 150 has an output directed through squaring amplifier 152 to produce a 100 KHz output in line 154. This output is divided by ten by divider 156 to produce clocking pulse $t_0$ in line 158. Divider 156 is an SN 74L90 decode counter of the type sold by Texas Instruments. This clocking pulse has a frequency of 10 KHz. Output 158 is directed to NAND gate 160 which is enabled by a logic 1 for signal $\overline{GCP}$. $\overline{GCP}$ is the general clearance pulse and has a logic 1 during normal operation. Only at the start of the system is a logic O produced in this line. When a general clear pulse $\overline{GCP}$ appears, NAND gate 160 is inhibited. Since this happens only during initiation of system A, it can be assumed throughout the logic diagrams that the general clearance pulse $\overline{GCP}$ is a logic 1. Consequently, the output 162 of NAND gate 160 normally produces $\overline{t_0}$. This is inverted by inverter 164 to produce $t_0$ in line 166. This forms one input of NAND gate 170. The other inputs are $\overline{X}$ and Y. As will be apparent in FIGS. 7 and 7A, $\overline{X}$, Y are each a logic 1 only during the decision stage or mode of the digital detector system A. Consequently, NAND gate 170 is operable only during the decision mode. At that time, $t_o$ passes through NAND gate 170 in its inverted form. This controls D-type SCC flip-flop 180 having standard terminals, i.e., a D transfer terminal, a C clock terminal, a Q output terminal, and a $\overline{Q}$ inverted output terminal. The set terminal S is latched to logic 1; therefore, flip-flop 180 can not be set by terminal S. The reset terminal R is controlled by the $\overline{GCP}$ logic. Consequently, at start up of system A, flip-flop 180 is reset to a logic 0. This shown in FIG. 6A. The $\overline{Q}$ output $\overline{SCC}$ is connected to the D terminal by line 182 and to NAND gate 184 by line 186. The Q output, SCC, is connected to NAND gate 190 by line 192. The outputs of NAND gates 184, 190 are inverted by inverters 194, 196 to produce $t_1$, $t_2$, respectively. The production of clocking pulses or control pulses $t_1$, $t_2$ is also effected by logic in line 200 which is the output of gate 170. This output is inverted by inverter 202 having outputs 204, 206 connected to the inputs of gates 184, 190, respectively.

The operation of the logic circuit illustrated in FIG. 6 is graphically represented in FIGS. 6A, 6B. Initially, the $\overline{GCP}$ resets flip-flop 180. This produces a logic 0 in line 192. Consequently, $t_2$ is logic 0. Lines 182, 186 are at a logic 1. This enables gate 184. Without a $t_o$ pulse, the three inputs, $t_o$, $\overline{X}$ and Y are not all at a logic 1. This condition can occur only during a decision mode when $\overline{X}$ and Y are at a logic 1 and when there is a $t_o$ pulse. Consequently, initially a logic 1 appears in line 200. This produces a logic 0 in both lines 204, 206. Both gates 184, 190 are inhibited. This inhibits either a $t_1$ pulse or a $t_2$ pulse.

Assume now that system A is operating in the decision mode or stage which gives a logic 1 for $\overline{X}$ and Y. Before a $t_o$ pulse is received by gate 170, line 200 remains at a logic 1. Upon receipt of the first $t_o$ pulse during the decision mode, line 200 shifts to a logic 0 and is directed to the clocking terminal C. Flip-flop 180 is not clocked until the positive going edge of the negative pulse; therefore, flip-flop 180 stays in its original condition while the first pulse of $t_o$ exists. A logic 0 in line 200 during the existence of the first $t_o$ pulse produces a logic 1 in lines 204, 206. Since only gate 184 is enabled, the logic 1 pulse in line 204 produces a $t_1$ pulse. This operation does not produce a $t_2$ pulse during this first $t_o$ pulse. When the $t_o$ pulse disappears, line 200 shifts back to a logic 1. This stops the $t_1$ pulse and clocks flip-flop 180 to transfer the logic of the D terminal to the Q terminal (SCC). This immediately provides a logic 1 in line 192 so that gate 190 is enabled. However, the logic 1 in line 200 when there is no $t_o$ pulse produces a logic 0 at line 206. No $t_2$ pulse is created at this time. Line 186 now shifts to logic 0 to inhibit gate 184. In this condition, there is no $t_1$ or $t_2$ pulse. On the next $t_o$ pulse, line 200 again shifts to 0 to provide a logic 1 in lines 204, 206. This actuates gate 190 to produce a $t_2$ pulse. Flip-flop 180 is conditioned for a clock; however, clocking occurs when the $t_o$ pulse disappears. At that time, line 200 shifts back to logic 1 to clock the SCC flip-flop 180 back into its original, or initial condition with a logic 0 at the Q terminal. This is illustrated in FIGS. 6A and 6B.

In summary, the circuit of FIG. 6 is operated only during the decision mode. When in this mode, the logic on lines $\overline{X}$ and Y enables gate 170 so that pulses $t_o$ create first a $t_1$ pulse and then a $t_2$ pulse. This starts and then stops the decision mode of the system A. Of course, the $\overline{t_2}$ line is the inverse of $t_2$ and produces a negative pulse at he end of the decision mode or stage of system A.

STAGE CONTROL

Figures 8A, 9:
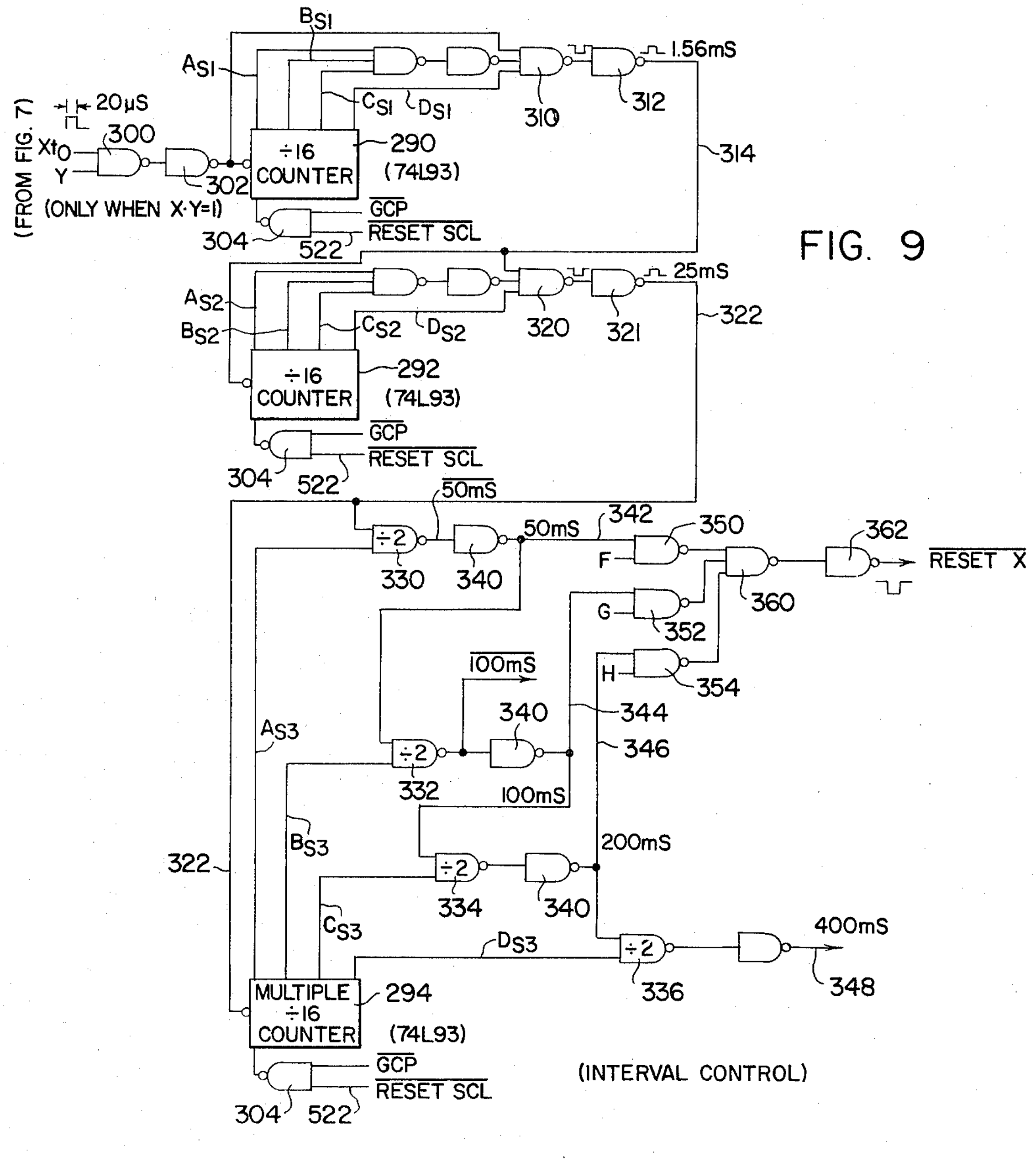
FIG. 8A is a truth table showing operating characteristics of the combined network and logic diagram of FIG. 8.
FIG. 9 is a combined block diagram and logic diagram illustrating the interval control function of the preferred embodiment of the present invention which employs the output of FIG. 8 to control the counting interval of the digital detecting system.

As previously mentioned, the digital loop detecting system A includes two basic stages. The first stage is the counting stage or interval which has a relatively long time to allow upcounting of the accumulator 12. The next stage is the decision stage or mode which occurs in the 0.4 mS between counting intervals. As was apparent in FIG. 6, the stage in which system A is operating at any given moment is controlled by the logic of lines X and Y. To control this logic, the preferred embodiment of the invention utilizes the circuit illustrated in FIG. 7. The X logic is the condition of flip-flop 210 and the Y logic is the condition of flip-flop 212. Referring more specifically to the X flip-flop 210, which is a standard D-type flip-flop, the Q terminal is connected to line 220. This line, which produces an X output, controls the D transfer terminal of Y flip-flop 212 and is directed to the input of NAND gate 222 having its output inverted by inverter 233. The other input of gate 222 is $t_o$; therefore, the output of inverter 223 is $Xt_o$, which is used in FIG. 9. The logic $\overline{X}$ appears at the $\overline{Q}$ terminal and in line 226. This logic is connected to gate 170 of FIG. 6. Referring now to the Y flip-flop 212, Q terminal is connected to line 230 and produces a Y logic. This logic is directed to the other inputs of gate 170 in FIG. 6. As is clearly illustrated, the $\overline{Y}$ logic appears at the $\overline{Q}$ terminal of flip-flop 212. This is connected by line 232 to the D terminal of X flip-flop 210 and to the input of NAND gate 233. The other input of gate 233 is the clocking pulse $t_o$ to produce an output $\overline{Y}t_o$ which is directed to the input of NAND gate 240. This gate controls the clocking of both flip-flops 210, 212. Gate 240 is also controlled by $\overline{t_2}$ of FIG. 6 and this logic 0 pulse occurs only during a decision mode when $\overline{X}$ and Y are at logic 1. Another input to the clocking gate 240 is $\overline{\text{RESET X}}$. The $\overline{\text{RESET X}}$ is a logic 0 pulse that is created at the end of the counting interval in a manner to be described later when the circuit of FIG. 9 is considered. Output 242 of gate 240 is inverted by the inverter 244 having an output 246 connected to the clocking terminals C of both flip-flops 210, 212.

The operation of the circuit as illustrated in FIG. 7 is represented in FIG. 7A. Initially the general clearance pulse $\overline{GCP}$ resets both flip-flops to a logic 0. This produces a transistion stage, identified as $\overline{X}$, $\overline{Y}$. In this condition, $\overline{Y}$ is a logic 1; therefore, gate 233 is enabled. During normal operation, $\overline{\text{RESET X}}$ and $\overline{t_2}$ are logic 1. Consequently, when gate 233 receives a $t_o$ pulse, $\overline{Y}t_o$ shifts to a logic 0. This produces a logic 1 in line 242 and a logic 0 in line 246. No clocking occurs until the $t_o$ pulse is terminated. This produces a logic 0 output in line 242 and a logic 1 in line 246. Flip-flops 210, 212 are clocked to the D terminal condition. Since $\overline{Y}$ is a logic 1, the X terminal (line 220) is clocked to a logic 1. X was at a logic 0; therefore, clocking of the Y flip-flop 212 has no effect. Y remains at a logic 0. This produces a second transistion stage X, $\overline{Y}$. On the receipt of a second $t_o$ pulse, the flip-flops are again clocked. $\overline{Y}$ is at a logic 1; therefore, there is no effect on the X flip-flop 210. However, the logic 1 in line 220 causes the Y flip-flop 212 to produce a logic 1 at its Q terminal. This produces a logic 1 in the Y line. Consequently, both X and Y are now at a logic 1. This is the counting mode or stage for system A. In this condition, $\overline{Y}$ is a logic 0;

therefore, gate 233 is inhibited. Subsequent $t_o$ pulses have no effect upon the flip-flops 210 and 212. This condition continues until a logic 0 appears at the input of gate 240. Since the system is in the accumulating or counting stage, there can be no $\overline{t_2}$ which is created only during a decision stage or mode of operation, as illustrated in FIG. 6. Consequently, the accumulating or counting stage or interval is terminated by a logic 0 $\overline{\text{RESET X}}$ pulse which controls the length of the counting interval and is created by the circuitry shown in FIG. 9.

Upon the receipt of the logic 0 $\overline{\text{RESET X}}$ signal, the decision mode is then initiated. Gate 240 clocks the $\overline{Y}$ logic into X flip-flop 210. This produces the $\overline{X}$, Y decision or process stage. This stage is continued until a $\overline{t_2}$ is received at the end of the decision stage, as discussed in connection with FIG. 6. When this negative pulse is received, flip-flops 210, 212 are again clocked into the initial clear condition with a logic 0 in both flip-flops 210, 212. This is the $\overline{X}$ $\overline{Y}$ transition stage. Upon the next $t_o$ pulse, X flip-flop 210 is clocked to create the second transistion stage of X, $\overline{Y}$. The two transistion stages are not used; however, the circuit illustrated in FIG. 7 develops two separate transistion stages between the decision stage and the accumulating stage. Other circuits could be provided for shifting the system A between the accumulation or counting interval and the decision interval stage.

INTERVAL SELECTOR CIRCUITS

FIGS. 8, 8A illustrate the interval selector circuit adapted to control the logic on lines M, N at the position 54 shown in FIG. 1. In accordance with the preferred embodiment of the invention, switch network 250 includes single pole, single throw switches 250*a*, 250*b* corresponding with lines or logic M, N, respectively. Lines 254, 256 connect the switch network 250 with NAND gates 260, 262 having outputs M, N. Inverters 264, 266, and 268 invert the lines M, N. The logic on lines M, N, and their inverted logic form $\overline{M}$, $\overline{N}$, control NAND gates 270, 272, and 274 having outputs inverted by inverters 280, 282, and 284, respectively.

The operation of the circuit shown in FIG. 8 is shown in the truth table of FIG. 8A. A logic 1 appears in line F when both M, N are at logic 0. This corresponds to a counting interval of 50 mS. In addition, the inputs to gate 274 are both logic 1. Consequently, a logic 0 appears on the "4" line and a logic 1 appears on the "8" line. This produces a threshold number of eight counts. By shifting switch 250*b* to its closed position, the logic on lines M, N is 01. This still shifts line F to a logic 1 and places a logic 1 in the "4" line. In this condition, the counting interval is still at 50 mS; however, the threshold is four counts. Continuing through the truth table of FIG. 8A, when the logic of M, N is 10, the inputs to gate 270 are both at logic 1. This produces a logic 1 at the output of inverter 280. Consequently, line G is at a logic 1 to select a 100 mS counting interval. By changing the logic of M, N to 11, the output of inverter 282 is a logic 1. This selects a 200 mS counting interval. In these last examples, one of the inputs to NAND gate 274 is a logic 0; therefore, the threshold is four due to a logic 1 on line "4".

The lines F, G, H, "8," and "4" are directed to other circuits to control the counting intervals and the threshold of the system A.

COUNTING INTERVAL CONTROL

As discussed in conjunction with FIG. 7, a negative pulse in the $\overline{\text{RESET X}}$ line stops the counting interval which is started by the appearance of a $t_o$ pulse. To control the length of the counting interval with the logic developed in lines F, G, H of FIG. 8, the circuit of FIG. 9 is used in the preferred embodiment. Three digital upcounters 290, 292, and 294 having four output binary counting terminals A, B, C and D are reset by NAND gates 304 having inputs $\overline{\text{GCP}}$ and $\overline{\text{RESET SCL}}$. Counters 290, 292 and 294 may be 4-Bit binary counters sold by Texas Instruments under serial number SN 74L93. $\overline{\text{GCP}}$ is the general clearance pulse used at the start of the system A. The $\overline{\text{RESET SCL}}$ is a logic 0 when a vehicle is first detected and before the output is set. In this manner, the negative pulse on the $\overline{\text{RESET SCL}}$ line starts the three counters at the reset condition. This is useful when a pulse mode is employed by the digital detecting system A. In this manner, the same output pulse length is created each time there is a detection of a vehicle by loop B. After the first detection of a given vehicle, the counters 290, 292, and 294 are not reset from one counting interval to the next since $\overline{\text{RESET SCL}}$ remains at a logic 1. As previously mentioned, a negative pulse in the $\overline{\text{RESET X}}$ line will stop the counting interval. The circuit of FIG. 9 produces this $\overline{\text{RESET X}}$ pulse. In accordance with the illustrated embodiment, NAND gate 300 is controlled by $Xt_o$ created by gate 222 and inverter 223 of FIG. 7 and Y from flip-flop 212. When X and Y are both at logic 1, i.e., during the counting or accumulating interval, each $t_o$ pulse produces a logic 0 output for gate 300. An inverter 302 inverts the pulse from gate 300 which is approximately 20 $\mu$S in width. This pulse is then introduced into counter 290. When the counter has counted 16 pulses to the binary number 15, i.e., outputs $A_{S1}$, $B_{S1}$, $C_{S1}$, and $D_{S1}$ have a binary logic of 1111, gate 310 is actuated. This produces a logic 0 output pulse until the next count by counter 290. Inverter 312 inverts the negative pulse to a positive pulse and directs it to line 314. This line is connected to the counting terminal of counter 292. The pulse in line 314 appears each 1.56 mS. Counter 292 operates similarly to counter 290 and produces a negative pulse at the output of NAND gate 320 after 16 pulses in line 314 have been counted. This negative pulse output of gate 320 is directed through inverter 321 into a positive pulse in line 322. The spacing of the pulses in line 322 are approximately 25 mS. NAND gates 330, 332, 334, and 336 use the logic of line 322 and the outputs of counter 294 for the purpose of producing multiples of pulsing rate of line 322. Each pulse in line 322 upcounts counter 294. Output line $A_{S3}$ is connected to the input of gate 330, output line $B_{S3}$ is connected to the input of gate 332, output line $C_{S3}$ is connected to the input of gate 334, and output line $D_{S3}$ is connected to the input of gate 336. The output of gates 330, 332, 334 are inverted by inverters 340. Output line $A_{S3}$ changes logic state on each pulse in line 322. Output line $B_{S3}$ changes logic state after each two pulses of line 322. In a like manner, the logic state of output line $C_{S3}$ changes logic state upon each fourth pulse. The last output line, $D_{S3}$ changes logic state after each eighth pulse of line 322. Combining this condition of the output lines from counter 294 with the prior outputs of inverters 340 produces logic in output lines 324, 344, 346 and 348 which are 50 mS, 100 mS, 200 mS and 400 mS, respectively. After 50 mS, a positive pulse appears in line 342. After 100 mS, a positive pulse appears in line 344. After 200 mS, a positive pulse appears in line 346. In a like manner, a pulse appears in line 348 after 400 mS. The logic 1 pulse in lines 342, 344, and 346 has no effect unless a logic 1 appears on one of the lines F, G or H. These lines are connected to NAND gates 350, 352 and 354, respectively, and correspond to the selected counting interval which interval remains the same when set into system A. The output gates 350, 352 and 354 are connected to the input of NAND gate 360 which has an output that is inverted by inverter 342 to produce a negative pulse in the $\overline{\text{RESET X}}$ line in accordance with the counting interval selected on lines F, G and H.

Figure 9A:
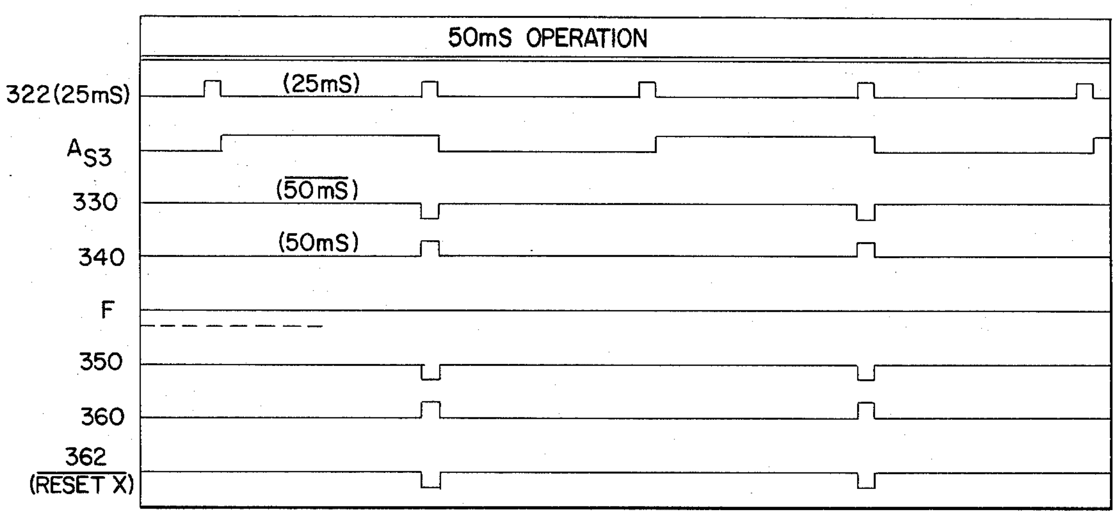
FIG. 9A is a pulse chart illustrating certain operating characteristics of the diagram shown in FIG. 9 for the 50 mS operation of the preferred embodiment of the present invention.

The counting creation of a $\overline{\text{RESET X}}$ pulse is similar for the three counting intervals; therefore, a detailed description of the 50 mS operation will apply to the 100 mS and 200 mS operation. The creation of the $\overline{\text{RESET X}}$ Pulse during the 50 mS interval is illustrated graphically in FIG. 9A wherein a positive pulse occurs every 25 mS in line 322. Upon each pulse, the output line $A_{S3}$ shifts logic state as shown in the second graph of FIG. 9A. Consequently, the output of gate 330 includes negative pulses spaced 50 mS. Inverter 340 inverts this to positive pulses spaced apart by 50 mS. If the 50 mS operation has been selected, a logic 1 appears in line F. This enables gate 350. Select lines G and H each include a logic 0. This provides a logic 1 output for NAND gates 352, 354 to enable 360. Upon receipt of a positive pulse from inverter 340, the output of gate 350 shifts from logic 1 to logic 0. This produces a logic 1 pulse each 50 mS at the output gate 360. Inverter 362 then creates the $\overline{\text{RESET X}}$ pulse as a negative pulse appearing each 50 mS. The graphs of FIG. 9A are continuous; however, as shown in FIG. 7, when $\overline{\text{RESET X}}$ pulse is received, the X flip-flops shift to logic 0. This immediately inhibits NAND gate 300 to prevent a repeat of the counting cycle. Consequently, when the circuit of FIG. 9 produces a $\overline{\text{RESET X}}$ pulse, no further counting is caused in counter 200 until the next counting interval. The counters remain in the condition when the $\overline{\text{RESET X}}$ pulse was created until the next counting interval. Counter 294 can continue to cycle from 0000 to 1111 without changing the effect of a counting operation. Counter 294 is used as a divide by two counter for the 25 mS pulses in line 322. However, when in the pulse mode it is desired to produce a pulse which is 100 mS long. This is assured by resetting the counters 290, 292 and 294 by NAND gate 304 with a negative pulse in the $\overline{\text{RESET SCL}}$ line. This line is developed upon the first detection of a vehicle during the pulse mode operation, which will be explained later.

PULSE MODE SELECTOR

Figure 10:
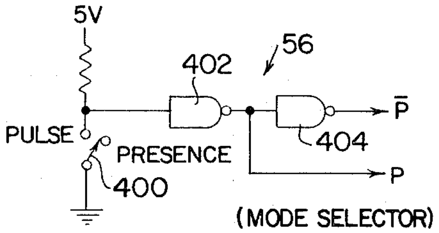
FIG. 10 is a combined switch diagram and logic circuit for shifting the preferred embodiment of the invention between the pulse mode and the presence mode.

Referring now to FIG. 10, a simple logic circuit is used to create a logic 1 in lines P and $\overline{P}$. When a logic 1 is in line P the system A is set for the pulse mode of operation. In other words, a single pulse occurs upon each detection. When a logic 1 appears in the $\overline{P}$ line, the system A is set for presence operation. In this type of operation, the output is a continuous level as long as the vehicle is detected and not forgotten. Various logic circuits could be used for this purpose; however, in accordance with the illustrated embodiment, a switch 400 is movable between the "pulse" position and the "presence" position as shown in FIG. 10. An inverter 402 inverts the switch condition and an inverter 404 reinverts the switch condition. Consequently, when the switch is in the "presence" position as shown, a logic 1 is directed to inverter 402. This produces a logic 0 in line P. Inverter 404 inverts the logic of line P and produces a logic 1 in the $\overline{P}$ line. This condition is shown in the truth table of FIG. 10. When switch 400 is moved in the pulse condition, inverter 402 is grounded. This inverts the logic in lines P, $\overline{P}$. These lines will be used in the control logic during the processing interval, as will be explained later.

COUNT ACCUMULATOR, REFERENCE COUNTER AND COMPARATOR

Figure 11:
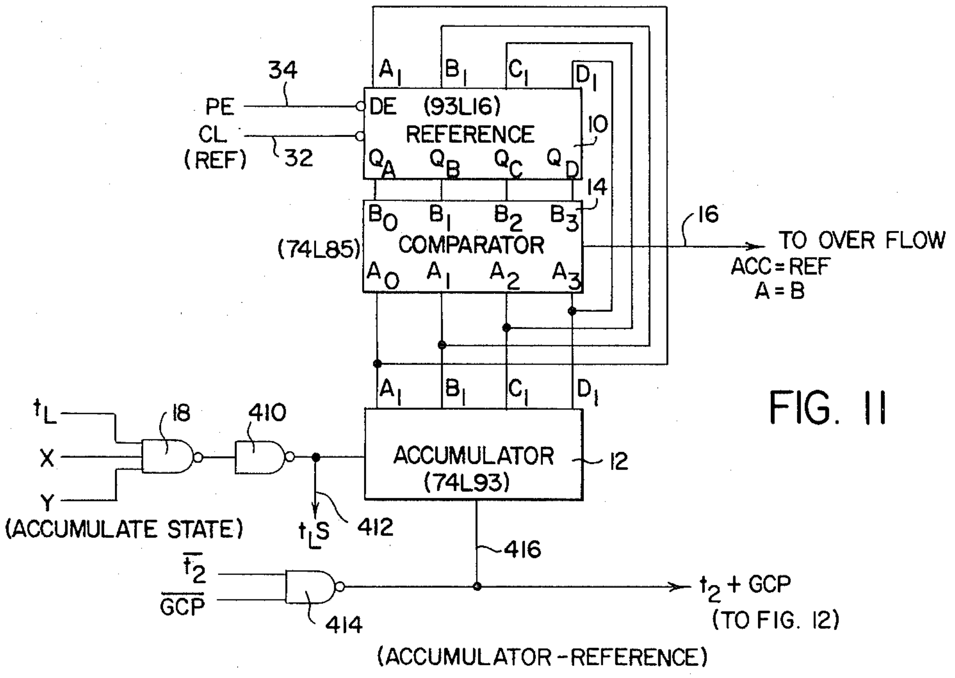
FIG. 11 is a schematic logic diagram illustrating the operating characteristics of the reference register or counter, the accumulator, and comparator used in accordance with the preferred embodiment of the present invention.

Referring now to FIG. 11, the operation of the reference counter 10, accumulator counter 12 and comparator 14 are illustrated. In the preferred embodiment, the reference counter, comparator and accumulator have 16 interconnecting lines so that a count of several thousand, during the counting interval, can be processed and compared with a reference count. In the illustrated embodiment, only four lines are shown. The 16 lines and associated counting stages accommodate a count of over sixty-five thousand during a counting interval. In pratice, reference register is a 4-Bit binary counter sold uner serial number 93L16 available from Fairchild Semiconductor, which has a parallel enable feature. Accumulator 12 is a 4-Bit binary counter serial number SN 74L93 sold by Texas Instruments, among others. Comparator 14 is a 4-Bit magnitude comparator sold by Texas Instruments. To provide 16 lines, four of these units are connected in cascade. It is appreciated that this illustration is to represent a sufficient counting capacity to correspond with the counting capacity during any of the selected counting intervals. Gate 18, as shown in FIG. 1, is controlled by three inputs, $t_L$, X and Y. Lines X and Y are each at a logic 1 only during the accumulating stage or counting interval of the digital detector; therefore, gate 18 is enabled only during the counting interval. At that time, pulses $t_L$ from the loop oscillator D are gated to an inverter 410 to produce a signal designated $t_L$S in line 412. The designation S is logic X Y which can be a logic 1 only when the system is operating in the accumulation stage. Line 412 is connected to the accumulator 12 so that the accumulator counts the pulses in the pulse train $t_L$. During the counting interval, a count determined by the preceding decision stage is contained in reference counter 10. During counting of counter 12, a comparison with the reference counter count is being made by comparator 14. When these two counts are equal, a signal is created in line 16 to actuate the overflow counter as will be explained in connection with FIG. 12. Line 16 and line 412, carrying the pulses $t_L$S, are directed to the overflow counter shown in FIG. 12, which will be explained in the next section. NAND gate 414 resets the accumulator 12 to zero count after each accumulation stage, i.e., counting interval. Gate 414 is controlled by $\overline{t_2}$ and $\overline{\text{GCP}}$. The general clearance pulse is a logic 0 at the start-up of the system A. This sets accumulator 12 to the zero count at the initial stage of operation. At the end of each counting interval, a logic 1 $t_2$ pulse is created. This produces a logic 0 $\overline{t_2}$ pulse to create a logic 1 in reset line 416 for the accumulator 12. Consequently, the accumulator is reset to zero at the end of each counting interval by the $t_2$ pulse. Referring now to the reference counter, a negative pulse in line 32 either increments the reference counter upwardly by 1 or gates the accumulated count of counter 12 into the reference counter or register 10. When line $\overline{PE}$ 34 is at a logic 1, a logic 0 pulse in line 32 increments register 10. Incrementing is used to "forget" a vehicle that is in the field of influence of the loop and is controlled primarily by the forced drift circuit of FIG. 15. A logic 0 in the $\overline{PE}$ line 34 causes the count within the reference counter to be shifted to the accumulator count upon a negative pulse in line 32. This is controlled by the circuitry shown in FIGS. 14 and 15 so that the reference count is changed whenever the count in the accumulator is not as great as the count in the reference counter or when a slight increase over the reference count has existed for a time determined by the positive drift accumulation circuit shown in FIG. 14.

OVERFLOW AND DETECTION CIRCUIT

After the comparator 14 has indicated that the accumulated count in accumulator 12 equals the reference count, an overflow signal of logic 1 is created in line 16. If there are still more counts, line 412 continues to create counts from the oscillator D, shown in FIGS. 1 and 11. This information, in the form of additional counts, is processed in the overflow and detection circuit illustrated schematically in FIG. 12. The GTC flip-flop 420, which is a standard D-type flip-flop, has its $\overline{Q}$ terminal connected to line 421. This directs $\overline{GTC}$ to the input of NAND gate 422 having additional inputs from line 16 (logic 1 when the reference count is equalled), line 412 (a logic 1 on each pulse of $t_L$S). Flip-flop 420 is reset by a negative $\overline{GCP}$ pulse to create a logic 1 in line 421 ($\overline{GTC}$). Output 423 of gate 422 is connected to one input of NAND gate 424, the output of which is inverted by inverter 426. This is the clocking circuit for the GTC flip-flop 420. As soon as a logic 1 appears in line 16, indicating that the accumulator count has equalled the reference count, the next pulse on line $t_L$ in line 412 produces a logic 0 in line 423. This clocks the GTC flip-flop 420 to produce a logic 1 in GTC line 430. A logic 0 then appears in line 421 (GTC) to inhibit gate 422. Consequently, the first pulse in line $t_L$ after the accumulator count equals the reference count clocks flip-flop 420 and prevents further clocking by gate 422. The logic on line 430 (GTC) indicates whether or not a count has been received after the reference count has been obtained in accumulator 12. This produces an indication of whether or not a differential exists between the accumulator count and the reference count. This concept is schematically illustrated in block 70 of FIG. 1. A logic 1 in line 430 is directed to the input of NAND gate 432 having an output 434 directed to gate 424. A logic 1 in line 430 enables gate 432 so that a subsequent $t_2$ pulse created at the end of the next decision stage resets flip-flop 420 to its original logic 0. In other words, the flip-flop 420 remains in its condition until the next decision mode has been completed.

Figure 12:
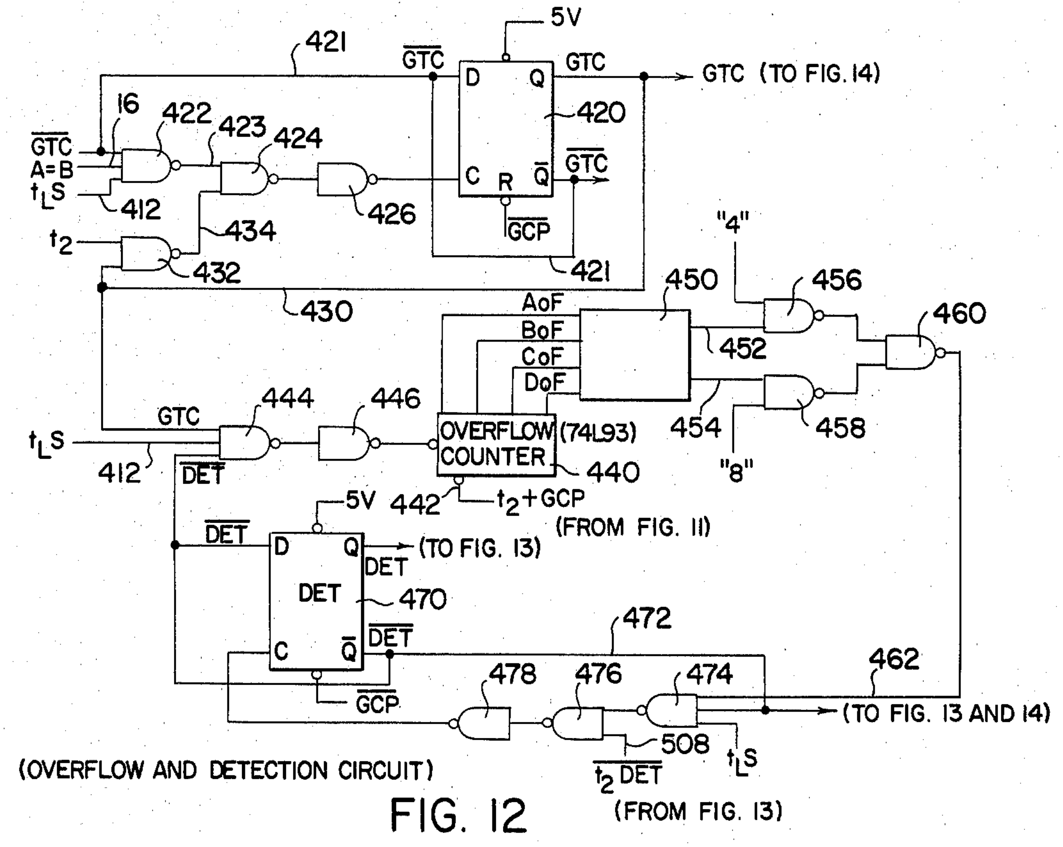
FIG. 12 is a logic diagram illustrating the overflow and detection circuit of the preferred embodiment of the present invention.
Figure 12A:
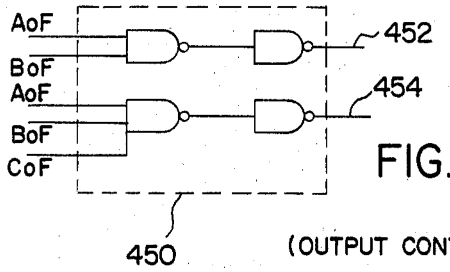
FIG. 12A is a logic diagram of the type used in one area of the circuit shown in FIG. 12.

Block 64, shown in FIG. 2, requires a determination of whether or not the accumulated count has exceeded the reference count by more than the threshold number, in which the preferred embodiment is either 4 or 8 counts. Circuitry for accomplishing this logic processing function is illustrated in FIG. 12 wherein an overflow counter 440 counts pulses exceeding the reference count. Overflow counter 440 may be a 4-Bit binary counter such as S.N. 74L93. Line 442 resets the overflow counter 440 whenever $t_2$ appears at the end of the decision or processing mode. Of course, at the start of the system A a GCP pulse will reset this counter also. In the first count after the reference count has been reached, the GTC flip-flop is clocked. This produces a logic 1 in line 430 directed to the input of NAND gate 444 having an output inverted by inverter 446. Upon the next count, a positive pulse is received in line 412 ($t_L$S). The $\overline{DET}$ line is a logic 1 since there has been no detection, i.e., the overflow counter 440 has not counted beyond the threshold number. With a logic 1 in line 430 and the $\overline{DET}$ line, pulses in line 412 ($t_L$S) are inverted and used to clock overflow counter 440. A binary decoder 450, of any standard design, then produces a logic 1 in line 452 on the third count of counter 440 and a logic 1 in line 454 on the seventh count of the overflow counter. A binary coder which can perform this function is illustrated in FIG. 12A. The first count is used to set flip-flop 420; therefore, the third count represents four counts over the reference counter and the seventh count represents eight counts over the reference counter. After the third count, line 452 remains at a logic 1. In a like manner, after seven counts, line 454 remains at a logic 1. Lines 452, 454 are connected to NAND gates 456, 458, respectively. These gates also receive the logic on lines "4"and "8," respectively. If the threshold number is four, a logic 1 appears in line "4." This enables gate 456 so that a logic 1 in line 452 produces a logic 0 to the input of NAND gate 460. The output line 462 of this gate then shifts to a logic 1. The same occurs if the threshold number is eight. In that instance, a logic 1 appears in line "8." Thus, a logic 1 appears in line 462 after the threshold number has been reached.

The detection flip-flop 470 (DET) includes a $\overline{Q}$ line 472 ($\overline{DET}$) connected to the D terminal of flip-flop 470, the input of gate 444, and the input of a NAND gate 474. Gate 474 is also controlled by line 462 and a pulse from the oscillator D. When the threshold count has been reached, line 462 is shifted to a logic 1. Upon receipt of the next pulse, the three inputs of gate 474 are each at a logic 1. A logic 0 from gate 474 is directed to the input of NAND gate 476. The other input of this gate is normally enabled by a logic 1 in the $\overline{t_2 DET}$ line. Consequently, the output of gate 476 is a logic 1 to produce a logic 0 clocking pulse at the C terminal of flip-flop 470. This sets the flip-flop on the next $t_L$S pulse after the threshold has been reached in a given counting interval to indicate that a vehicle has been detected by loop B. Gate 474 is then inhibited by a logic 0 in line 472. The DET flip-flop is clocked during each counting interval when the threshold number has been exceeded. At the end of each decision stage, a negative pulse appears in line $\overline{t_2 DET}$ when flip-flop 470 has been set, to reset the flip-flop for the next counting interval.

In operation, when the threshold has been exceeded by the next pulse from oscillator D (line $t_L$S), gate 474 clocks flip-flop 470 to the logic 1 set condition. When this happens, a logic 0 appears in line 472 ($\overline{DET}$). This inhibits gate 444 to stop counting of counter 440. The circuit shown in FIG. 12 now remains in the set condition even if additional counts are received from oscillator D. A logic 1 appears in line 430 (GTC) a logic 0 appears in line 421 ($\overline{GTC}$), a logic 1 appears in the DET line, and a logic 0 appears in line 472 ($\overline{DET}$). This logic indicates that a count has exceeded the reference count and that it has exceeded the reference count by greater than the threshold number. These logic operations are used in practicing the logic steps, as shown in FIG. 2. After this information has been used in the processing or decision stage of system A, a $t_2$ pulse is received. This actuates gate 432 and clocks flip-flop 420 into its original condition. Also, line 442 resets counter 440 to its original condition, and the second input of gate 476 becomes a logic 0 since both DET and $t_2$ are at a logic 1 during a $t_2$ pulse after the flip-flop 470 has been set. The overflow and detection circuit of FIG. 12 is then ready to repeat its cycle during the next counting interval of the accumulator 12.

OUTPUT CONTROL LOGIC CIRCUIT

Figure 13:
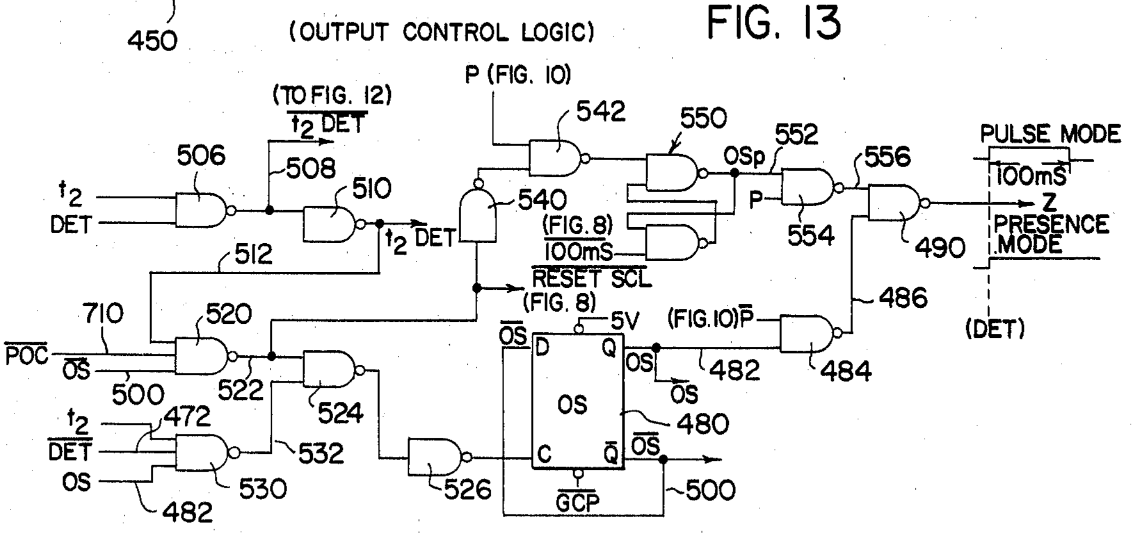
FIG. 13 is a logic diagram illustrating the output control for both the pulse mode and presence mode of operation for the preferred embodiment of the present invention.

The output logic circuit employed in the preferred embodiment of the present invention is schematically illustrated in FIG. 13. An output (OS) flip-flop 480, in the form of a standard D-type flip-flop, has a Q terminal output at line 482, which is labeled OS. Line OS is at a logic 1 when the OS output flip-flop is set. Line 482 is connected to the input of a NAND gate 484 which is enabled by a logic 1 in the $\overline{P}$ line. As shown in FIG. 10, the $\overline{P}$ line is a logic 1 when system A is in the presence mode. The output line 486 is directed to an output NAND gate 490 for controlling output line Z. A logic 1 in both line 482 and line $\overline{P}$ produces a logic 0 in line 486 so that a logic 1 appears in the output line Z. This logic 1 remains in the output line Z until the flip-flop 480 is reset to produce a logic 0 in line 482 (OS) indicating that the output flip-flop is not set. This general logic function is schematically illustrated in block 92 of FIG. 2. The $\overline{Q}$ terminal of flip-flop 480 is connected to line 500 ($\overline{OS}$), which is connected, in turn, to the D terminal of the flip-flop. This causes alternate logic in line 482 upon clocking the terminal C of OS flip-flop 480.

To control flip-flop 480 there is a NAND gate 506 having an output 508. Since the inputs of gate 506 are $t_2$ and DET, the output on line 508 is $\overline{t_2\,DET}$. This line is connected to the circuitry of FIG. 12 for resetting the detection flip-flop 470. The logic state on line 508 is inverted by inverter 510 to produce a logic on output 512 which is labeled $t_2$ DET. This output is one of the control inputs for NAND gate 520 having an output 522 which is the $\overline{\text{RESET SCL}}$ line used in FIG. 9 for resetting the counters 290, 292 and 294 at the start of a vehicle detection. NAND gate 524 has one input connected to output 522 and an output which is inverted by inverter 526 connected to the clocking terminal C of flip-flop 480. NAND gate 530 is controlled by $t_2$, $\overline{DET}$ and OS for resetting flip-flop 480 when it is set and there is no detection during the next counting interval. The output 532 of gate 530 is connected to the other input of gate 524 for the purpose of clocking the flip-flop.

As so far described, the output control logic circuit of FIG. 13 is used during the presence mode of operation. Assuming a condition wherein the output is not set, i.e., OS is at a logic 0, when a detection is made by flip-flop 470, DET will be at a logic 1. During the decision mode, a $t_2$ pulse will appear. This pulse will combine with the logic 1 on line DET to create a logic 0 in output 508 of gate 506. This logic 0 will reset the DET flip-flop of FIG. 12 and produce a logic 1 in line 512 connected to gate 520. Since OS flip-flop 480 is not set, a logic 1 appears in line 500 which is also connected to the input of gate 520. Line $\overline{POC}$ is a power on control which is normally logic 1; therefore, all inputs to gate 520 are at logic 1. This produces a logic 0 in output line 522 causing a logic 1 at the output side of gate 524. Inverter 526 inverts the logic 1 to produce a logic 0 pulse at the clocking terminal C. Flip-flop 480 is thus clocked to produce a logic 1 in line 482. As previously mentioned, this logic 1 then turns on the output line Z to actuate any appropriate output circuit. When flip-flop 480 is set, a logic 0 appears in $\overline{OS}$ line 500. This inhibits gate 520 to produce a constant logic 1 in line 522 to enable gate 524. Line 532 forms the second input to gate 524. Since there has been a detection, $\overline{DET}$ is at a logic 0. This creates a logic 1 in line 532 to produce a logic 1 at the clocking terminal C of flip-flop 480. This does not clock the flip-flop. During subsequent decision stages, as long as there is a detection, $\overline{DET}$ remains at logic 0 and line 532 remains at a logic 1. Also, $\overline{OS}$ line 500 remains at a logic 0 to hold line 522 at a logic 1. Clocking of OS flip-flop 480 can not take place in this condition. This logic condition of a detection after the output Z has been energized and the OS flip-flop set is illustrated by output line 110 of block 92.

When the detected vehicle disappears from the field of influence of loop B, the accumulator count during a counting interval will not exceed the reference count by the threshold count; therefore, the detection flip-flop 470 of FIG. 12 will not be set during the counting interval. This will produce a logic 0 in the DET line and a logic 1 in the $\overline{DET}$ line. When that happens, the inputs to gate 530 are all a logic 1 upon receipt of a $t_2$ pulse. This creates a logic 0 in line 532 and a logic 1 at the output of gate 524. This clocks flip-flop 480 into its reset condition with a logic 0 in OS line 482 and a logic 1 in line $\overline{OS}$ 500. The circuit is prepared for the next detection of a vehicle by loop B.

The circuitry of FIG. 13 is also used when the digital detector A is set to operate in the pulse mode. The logic on line 522, which is a logic 0 on the first detection of a given vehicle, is inverted by inverter 540 and connected to the input of NAND gate 542. This gate controls flip-flop 550 having an OSp output 552 connected to a second NAND gate 554. The output 556 of gate 554 controls output gate 490 in a manner similar to the operation during the presence mode. Gates 542, 544 are enabled by a logic 1 on lines P which are created by the circuitry shown in FIG. 10. Flip-flop 550 is reset after $\overline{100\text{ mS}}$ by the 100 mS line from an interval control circuit shown in FIG. 9.

When in the pulse mode, the output on line Z for each vehicle detected is a pulse having a known length. This mode does not produce an output signal for the total time a vehicle is being detected by the system A. The operation during the pulse mode is clearly apparent from a review of the counting circuit shown in FIG. 9 and the logic of FIG. 13. When a vehicle is first detected, OS flip-flop 480 has not been set. The output of gate 510 will be a logic 0 to produce a logic 1 at gate 520. As previously described, this produces a logic 0 pulse in line 522 for clocking OS flip-flop 480 into its output set condition, i.e., a logic 1 in OS line 482. The short logic 0 pulse in line 522 creates a $\overline{\text{RESET SCL}}$ pulse to reset all counters 490, 492 and 494 of FIG. 9. There is no counting yet because X and Y are not both at logic 1 during the decision mode. The logic 0 in line 522 is inverted to activate gate 542 which creates a logic 0 in the input of flip-flop 550. This flip-flop creates a logic 1 in OSp line 552. A logic 0 is then created in line 556 to activate output gate 490. During the next counting interval, the circuit of FIG. 9 starts counting to establish the counting interval for accumulator 12.

To show the operation of FIG. 13, assume that the counting interval is 50 mS. There will be no pulse in the $\overline{\text{100 mS}}$ line during the next counting interval. With the output flip-flop 480 set to a logic 1 output, $\overline{\text{OS}}$ line 500 is at a logic 0. Consequently, the line 522 is latched to a logic 1 as long as the OS flip-flop is set and there will be no $\overline{\text{RESET SCL}}$ pulse. Thus, the counters 290, 292 and 294 will not be reset. During the next 50 mS counting interval, a $\overline{\text{100 mS}}$ pulse will be created. When that happens, a negative pulse occurs in the $\overline{\text{100 mS}}$ connected to flip-flop 550. This logic 0, combined with the logic 1 at the output of gate 542 when line 522 is latched to a logic 1, creates a logic 0 in OSp line 552. This gives a logic 1 in line 556 to create a logic 0 in the output line Z after 100 mS. The decision mode requires less than 0.4 mS; therefore, even if more than one counting cycle is required to produce a $\overline{\text{100 mS}}$ pulse the total width of the pulse is approximately 100 mS. Of course, if the counting interval is 100 mS or 200 mS, the $\overline{\text{100 mS}}$ will occur during each counting interval. By not resetting the counter with a $\overline{\text{RESET SCL}}$ pulse except on the first detection, the output pulse in line Z will be 100 mS. After the pulse has been completed, flip-flop 550 must be reset by the disappearance of the vehicle and the appearance of another vehicle substantially in accordance with the operation described in the presence mode of operation.

POSITIVE DRIFT ACCUMULATION CIRCUIT

As explained in connection with FIG. 2, if the accumulated count during a counting interval exceeds the reference count by a number less than the threshold number, line 82 of block 70 is actuated. This essentially controls, in the flow chart, the operation of the positive drift counter or positive drift accumulation circuit shown in FIG. 14. If the count remains higher than the reference count for a time determined by the positive drift counter, line 88 is actuated to reset the output, gate the accumulator count into the reference counter and then reset the positive drift counter for subsequent operation. In other words, slight upward drifts in the accumulated count are removed after a preselected time determined by the positive drift counter.

Figure 14:
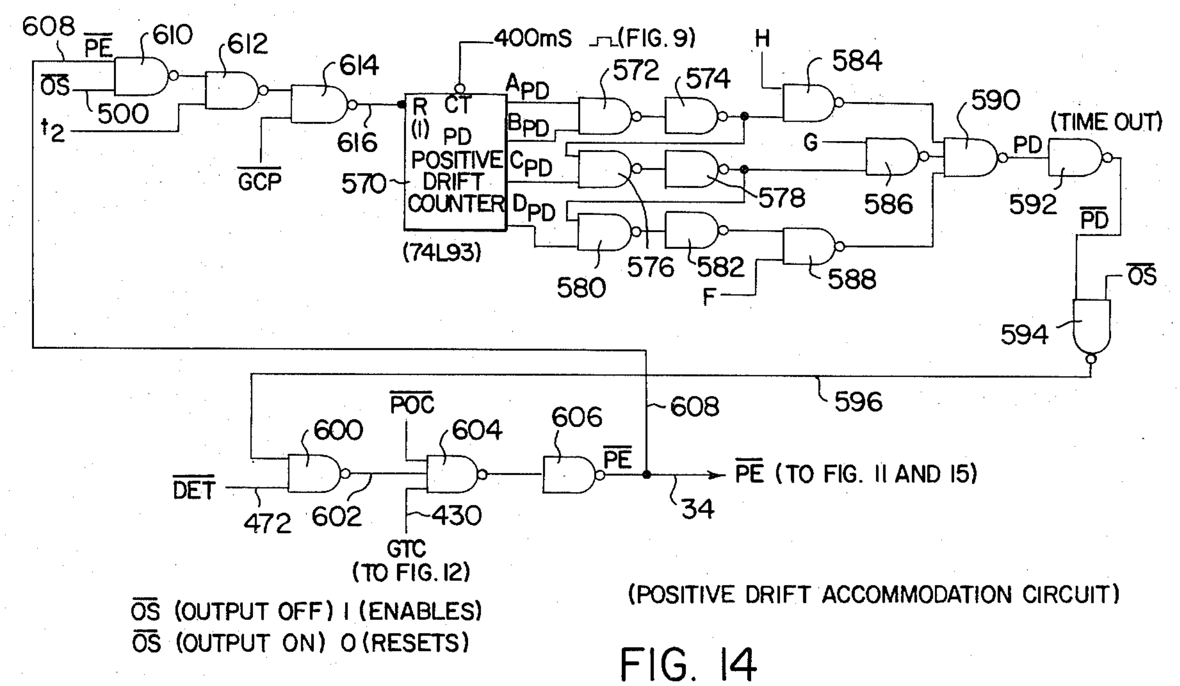
FIG. 14 is a logic diagram illustrating the positive drift accumulation circuit which is used primarily to allow slight upward drift in the input counting train before a new reference count is gated into the preferred embodiment of the present invention.

In accordance with the preferred embodiment of the invention, the positive drift accumulation circuit takes the form illustrated in FIG. 14. A positive drift counter (PD) 570 is counted up by a pulse in the 400 mS line from FIG. 9. Consequently, when the positive drift counter 570 is enabled by applying a O to the reset terminal R, it is up counted substantially each 400 mS. The output of the counter includes a network of NAND gates 572, 574, 576, 578, 580 and 582 for controlling interval enabled NAND gates 584, 586 and 588 each having an output connected to the input of NAND gate 590. The output of 590 is the PD line which is at a logic 0 when the positive drift counter has not timed out and a logic 1 when the counter has timed out. The timing cycle is determined by activating one of the interval lines F, G or H as explained in FIG. 8. Of course, the positive drift counter could be controlled by an external manual adjustment to set the desired time irrespective of the selected counting interval.

In operation, when output lines $A_{PD}$, $B_{PD}$ are at a logic 1, and a logic 1 has been set in line H, gate 584 directs a logic 0 to gate 590. This produces a logic 1 in line PD indicating that the positive drift counter has timed out. In a like manner, a logic 1 in the G line and lines $A_{PD}$, $B_{PD}$ and $C_{PD}$ produce a logic 1 in the PD line. When a 50 mS timing interval has been selected, a logic 1 appears in line F; therefore, a logic 1 in all output lines for counter 570 are required to set the PD line to a logic 1. In summary, according to the selected interval, a different count on counter 570 is used to time out the positive drift counting circuit.

An inverter 592 has a $\overline{\text{PD}}$ output, which is directed to the input of NAND gate 594 having an output 596. Line $\overline{\text{OS}}$ which is a logic 1 when the output is not set produces the second input to gate 594. It is obvious that gate 594 will provide a logic 1 in line 596 when either the PD line is a logic 1 or the OS line is a logic 1. In either case the accumulated count is gated to the reference register 10 provided there is no detection, i.e., DET is a logic 0. If OS is a logic 1 and DET is a logic 0, the vehicle that has been occupying the loop has left or has been "forgotten." When OS is a logic 1, $\overline{\text{OS}}$ is a logic 0 producing a logic 1 in output line 596 of gate 594. If DET is a logic 0, $\overline{\text{DET}}$ is a logic 1 and input line 472 of gate 600 will be a logic 1. Output 602 will, therefore, be a logic O producing a logic 1 on the output of gate 0 and a logic 0 on $\overline{\text{PE}}$ line 608. This line generally corresponds to line 34 of FIG. 11. When a logic 0 appears in line 34 (line 608) the accumulator count is gated into the reference counter. In addition, line 608 controls NAND gate 610 having a second input $\overline{\text{OS}}$ which indicates the condition of the output flip-flop 480 shown in FIG. 13. The output of gate 610 controls NAND gate 612 having a second input $t_2$. This gate in turn controls gate 614 having a second input $\overline{\text{GCP}}$ which is normally logic 1. A logic 1 pulse in output 616 of gate 614 resets the positive drift counter 570. Periodic resets on line 616 will prevent any output from the positive drift circuitry, output PD of gate 590, because the reset pulses occur more frequently than the 400 mS clocking pulses. The positive drift counter may be a 4-Bit binary counter, such as SN 74L93.

Referring now to FIG. 2, positive drift counter is reset at various times. If the output is set, as indicated schematically by output line 110 of block 92, the positive drift counter is reset as indicated by block 112. This is apparent in reviewing the operation of NAND gate 610. If the output is set, a logic 0 appears in the $\overline{\text{OS}}$ line 500. A logic 0 produces a logic 1 at one input of gate 612. During the decision mode a $t_2$ pulse is then received which produces a logic 0 output for gate 612 which is inverted by enabled gate 614 to produce a logic 1 in line 616. This resets the positive drift counter.

The positive drift counter is reset when the accumulated count does not exceed the reference count, as indicated by line 72 from block 70 in FIG. 2. In this condition, the output in line 430 of the GTC flip-flop is a logic 0 during the decision mode. This produces a logic 1 at the input of inverter 606 and a logic 0 in line 608. This produces a logic 0 pulse in the $\overline{\text{PE}}$ line, which is directed to the other input of NAND gate 610. A logic 0 then produces a logic 1 at the input of gate 612. When the positive $t_2$ pulse appears, a logic 0 is directed to the input of gate 614 to produce a logic 1 in line 616. This resets the positive drift counter. In addition, the $\overline{\text{PE}}$ line also allows gating of the accumulator count to the reference counter as indicated in step 2 of block 74 in FIG. 2. Of course, if there is no detection by flip-flop 470 in FIG. 12, the output OS flip-flop will be reset as indicated by the other step in block 74.

So far, the circuitry for accomplishing the functions indicated in blocks 74 and 112 of FIG. 2 have been explained in connection with FIG. 14. Referring now to the function of block 84 of FIG. 2, the first counting interval which produces a count exceeding the reference count by a number less than the threshold will enable the positive drift counter. Referring now to FIG. 14, on the first updrift of the accumulated count, the counter 570 will be reset and a logic 1 will appear in line 430 (GTC) indicating that the accumulated count exceeded the reference count. This produces a logic 0 at the input of inverter 606 and a logic 1 in the $\overline{PE}$ line 608. A logic 1 in this line inhibits gating of the accumulated count into the reference counter through line 34. At the same time, the logic 1 in $\overline{PE}$ line 608 produces a logic 0 at the output of gate 610, as previously mentioned. This produces a logic 0 in line 616 which enables or releases counter 570 to count. As long as the accumulated count exceeds the reference count by less than the threshold in subsequent counting, a logic 1 remains in line GTC during the decision mode. Consequently, the positive drift counter remains in its counting or timing mode and line 86 of FIG. 2 recycles the decision mode without changing the reference count. The GTC signal has enabled or started a timing cycle of counter 570 as indicated by block 84.

Assuming now that the accumulated count does not exceed the reference count for a time determined by the output circuit of the positive drift counter 570, a logic 0 will appear in GTC line 430 as soon as the timing interval produces a count which does not exceed the reference count. When this happens, a logic 1 is directed to inverter 606 and a logic 0 appears in line $\overline{PE}$. This resets the positive drift counter 570 as indicated by line 72 in block 74 of FIG. 2. In addition, the accumulated count is placed in the reference counter as a negative condition appears on $\overline{PE}$ line 34. The same thing will happen if the reference count is exceeded for a time greater than the timing cycle of the positive drift counter. When this happens, a logic 1 appears in the PD line. This produces a logic 1 in line 596 so that a logic 0 appears in line 602. This logic 0 causes the operation of line 88 shown in FIG. 2. A negative pulse in the $\overline{PE}$ line 34 places the accumulated count, which is now the upward drifted count, into the reference counter and line 608 resets the positive drift counter for subsequent operation. When this happens, the datum line or counts for operation of the system A has been changed by gating a higher count into the reference counter 10. This will cause operation of the system A based upon the higher reference count. In this manner, slight upward drift of the accumulated count during a timing interval for a time exceeding the selected time of the positive drift counter will change the reference count to remove the upward drift from consideration in the operation of the system A. A slight upward drift which lasts for a time not exceeding the positive drift counter time will have no effect in changing the count of reference counter 10.

FORCED DRIFT COUNTER

Figure 15:
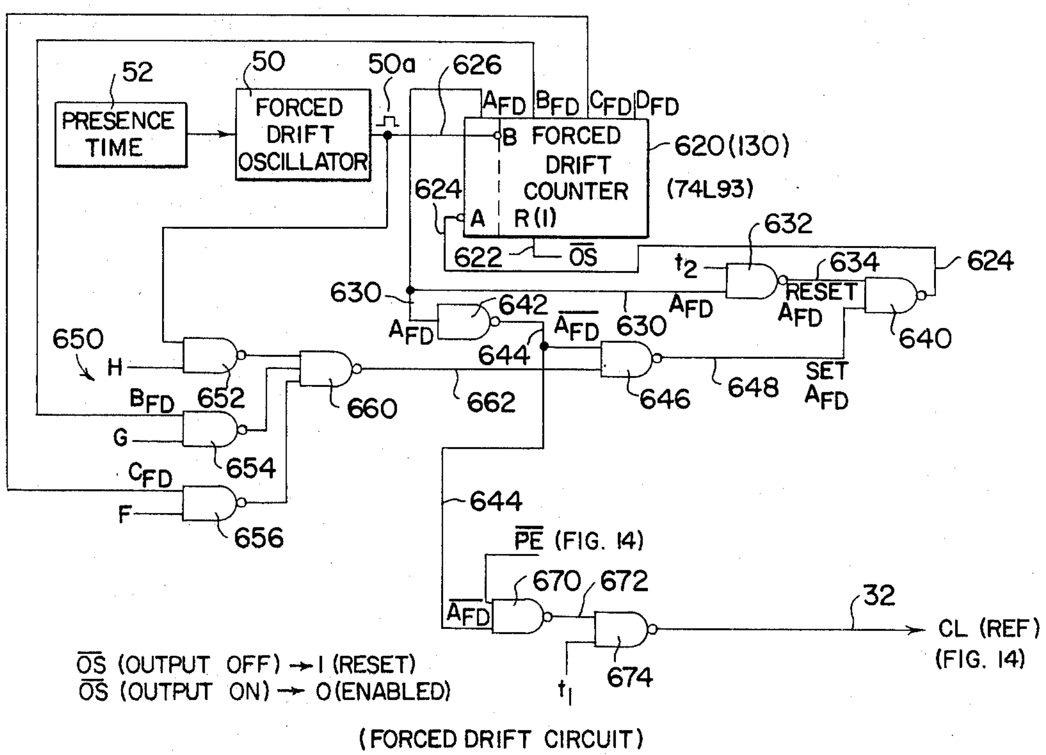
FIG. 15 is a logic diagram illustrating the forced drift circuit used to compensate for vehicles parked or stalled within the field of effect of the detector and also the circuit for gating a new reference count into the reference register or counter.

As illustrated in the logic flow chart of FIG. 2, when the output has been set and there is a count during the counting interval which exceeds the reference count by at least the threshold number, line 110 is actuated. This enables the forced drift counter of block 114 and determines whether or not the forced drift counter indicates that the reference counter should be incremented by 1. The forced drift circuit in accordance with the preferred embodiment of the invention is illustrated in FIG. 15 wherein a forced drift counter 620 has a reset line 622 ($\overline{OS}$). This counter is the counter 130 shown schematically in FIG. 4. If the output is not set, a logic 1 is held in line 622. This maintains counter 620 in the reset condition. This function is illustrated in block 100 of FIG. 2. Assume now that a vehicle has been detected and the output has been set previously, the $\overline{OS}$ line 622 shifts to a logic 0. This releases counter 620 for operation. This function is illustrated in block 114 of FIG. 2. Consequently, the $\overline{OS}$ line either inhibits or enables forced drift counter 620. The forced drift counter is illustrated as a four stage binary counter; however, the A stage, having an output line $A_{FD}$, is operated separately and counted between logic 0 and logic 1 by the negative edge of a positive pulse applied to terminal A. The other three stages B, C and D, are used for counting by line 626 connected to the B terminal of the counter 620. Forced drift oscillator 50 produces a pulse 50a at a rate or spacing determined by the presence time manual control 52. This pulse can be created over any selected time to control the rate at which the detected vehicle is forgotten by the forced drift circuit. In practice the adjusted rate is between one pulse per second and one pulse per minute. The rate determines how rapidly a vehicle remaining within the detecting range of loop B will be forgotten.

To reset the A stage when the $A_{FD}$ line 630 is at a logic 1, there is provided a NAND gate 632 having a first input connected to line 630 and a second input receiving a positive $t_2$ pulse. The output 634 of this gate is connected to a control NAND gate 640 having an output connected to line 624 and the A terminal of counter 620. In operation, a logic 1 in the $A_{FD}$ line enables gate 632 so a $t_2$ pulse will produce a logic 0 in line 634. This will produce a logic 1 in line 624 to toggle the A stage of counter 620 to a logic 0. This is the reset condition of stage A. In this operation, the other input of gate 640 is held at a logic 1 by inverter 642 which inverts the $A_{FD}$ line to a $\overline{A_{FD}}$ line which is at a logic 0. This inhibits NAND gate 646 to produce a logic 1 in line 648. Thus, when the stage A is set to a logic 1, the $t_2$ pulse in the next decision stage resets stage A to a logic 0.

When the stage A flip-flop is reset to a logic 0, line $A_{FD}$ is at logic 0 and line $\overline{A_{FD}}$ is at logic 1. The $A_{FD}$ flip-flop does not immediately shift to the logic 1 set condition upon the next decision mode. The circuit for setting the stage A flip-flop of the forced drift counter to a logic 1 includes a gate network 650 including NAND gates 652, 654, and 656 enabled by a logic 1 on interval select lines H, G and F, respectively. The output of this network is a NAND gate 660 having an output 662 connected to the input of gate 646. Under operating conditions, two of the interval lines F, G and H will be at a logic 0. This will produce a logic 1 at two inputs of gate 660. The third interval line will have a logic 1; however, a logic 1 will still appear at the third input to NAND gate 660 until the additional input to the unlatched gage 652, 654, or 656 is also a logic 1. Normally the three inputs to NAND gate 660 are a logic 1 and a logic 0 appears in line 662. This produces a logic 1 in line 648 and a logic 0 in line 624, which cannot set the A stage of counter 620 to a logic 1.

When the A stage of counter 620 is reset to logic 0, a line 634 remains at logic 1. To set the A stage flip-flop to a logic 1, both inputs to one of the gates 652, 654, 656 must be at a logic 1. To illustrate their operation, assume that the counting interval is 200 mS. In this condition, a logic 1 appears in line H. As soon as a pulse 50*a* occurs, the output of gate 652 is a logic 0. This produces a logic 1 in line 662 which combines with the logic 1 in the $\overline{A_{FD}}$ line 644 to produce a set signal logic 0 in line 648. This produces a logic 1 in line 624. However, stage A is a JK flip-flop and requires a negative transition on the clock input. This counter may be a SN 74L93 4-Bit binary counter. When the pulse 50*a* falls, the negative transition propagates through logic gates 652, 660, 646 and 640 to toggle the A stage flip-flop to the logic 1 state.

If the timing interval is selected at 50 mS or 100 mS, a logic 1 appears in line F, G, respectively. The counting stages B, C and D of counter 620 now become active. When a pulse 50*a* is received at terminal B of counter 620, the B, C, D stages are upcounted. As soon as a logic 1 appears in output lines $B_{FD}$ or $C_{FD}$ which is connected to the enabled gate 654 or 656, a logic 0 appears in one of the inputs of gate 660. This sets the A stage in accordance with the previous description of gate 646.

In summary of operation, when the A stage of counter 620 is set to a logic 1 the next decision interval creates a $t_2$ pulse which resets the A stage to a logic 0. If the forced drift counter 620 is reset so that the A stage is at a logic 0, the pulses 50a are counted. Whenever a sufficient number of pulses determined by the interval selection has been received by the B and C stage of counter 620, a logic 0 appears in line 662 to set the A stage back to a logic 1 which immediately disappears during the $t_2$ pulse of the next decision mode. The time delay is during the interval when the A stage is at the reset condition logic 0. In this condition, the $\overline{A_{FD}}$ line 644, which is the output of the forced drift counter circuit is at a logic 1. The $\overline{A_{FD}}$ line is connected to one input of NAND gate 670 having the $\overline{PE}$ line as the other input. The output 572 of gate 670 is connected to NAND gate 674 which is controlled by the $t_1$ pulse of the decision mode. The output of gate 674 is a negative pulse in line 32 for incrementing reference counter 10 or for gating the accumulated count into the reference counter, as shown in FIG. 11.

As discussed in connection with FIG. 14, the $\overline{PE}$ line is at a logic 0 when the accumulated count is to be gated into the reference counter 10. When the logic of $\overline{PE}$ is low, a negative clocking pulse in line 32 causes gating of the accumulator count into the reference counter. When $\overline{PE}$ is high, a negative clocking pulse in line 32 increments the count on the reference counter 10 by a single count, as represented by block 122 in FIG. 2. Various commercially available counters can be used to obtain these gating and counting functions.

Referring now more specifically to FIG. 15, this circuit is operative for the purpose of incrementing the reference counter 10. If the reference counter is to be incremented, there has been a detection; therefore, $\overline{DET}$ is a logic 0 which places a logic 1 in line 602 of FIG. 14. This produces a logic 1 in the $\overline{PE}$ line. This logic 1 in the $\overline{PE}$ line enables gate 670 of FIG. 15. While the A stage of counter 620 is in the reset condition, a logic 1 appears in $\overline{A_{FD}}$. Consequently, a logic 0 is created in line 672. This holds line 32 to a logic 1. If the detected vehicle remains in the field of loop B, the circuit of FIG. 15 starts to increment the reference counter. After the gate network 650 sets the A stage of counter 620 by gate 646, a logic 0 appears in the $\overline{A_{FD}}$ line 644. This produces a logic 1 in line 672. As soon as the decision mode has started, a $t_1$ pulse occurs. This then produces a logic 0 in line 32 corresponding to the $t_1$ pulse. The reference counter is incremented because the $\overline{PE}$ is at a logic 1. The set logic 1 condition of the A stage in counter 620 is then removed by the subsequent $t_2$ pulse in the same decision mode. Consequently, the incrementing is caused by the $t_1$ pulse and the $t_2$ pulse resets the forced drift counter for subsequent use. This incrementing by 1 continues until the accumulated count does not exceed the reference count by the threshold number. When this happens, there is no detection. The $\overline{OS}$ line resets counter 620, and the $\overline{PE}$ line in FIG. 14 becomes a logic 0 to set the reference count to a new value upon the next $t_1$ at gate 674.

Figure 15A:
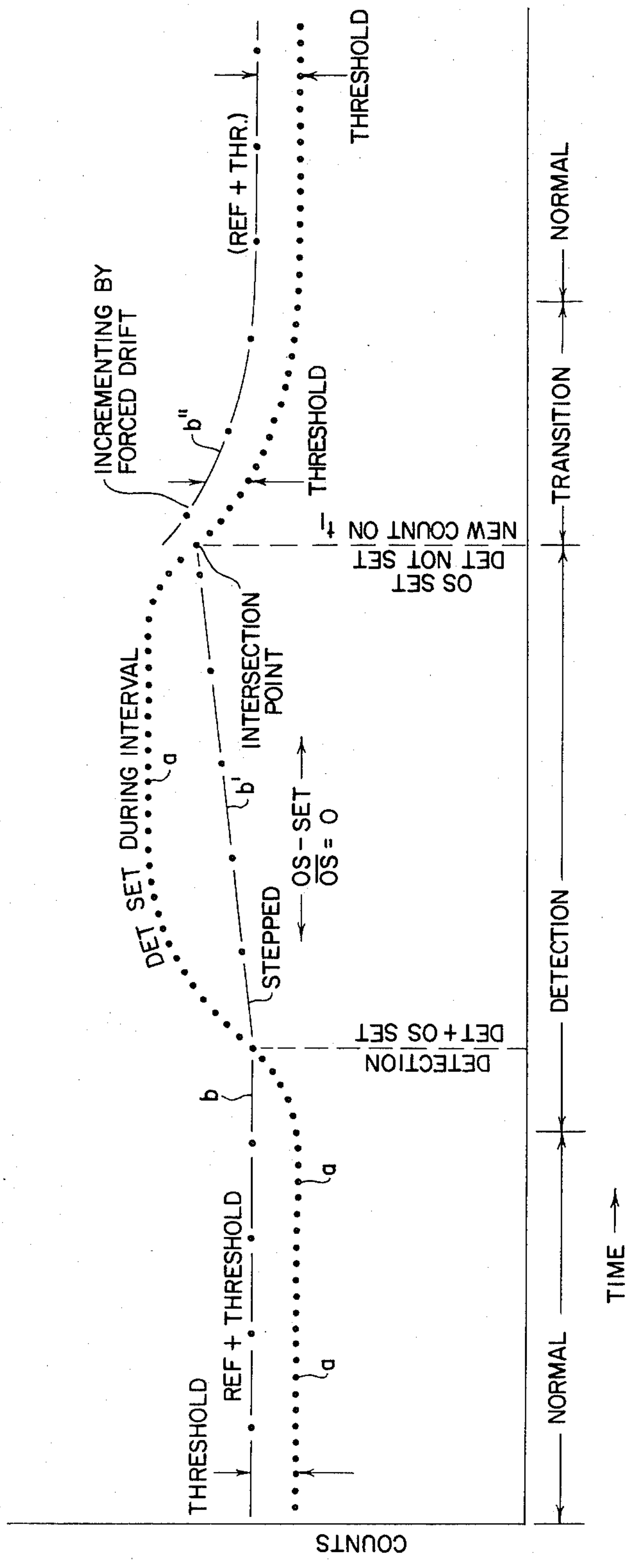
FIGS. 15A, 15B and 15C are charts illustrating operating characteristics of the diagrams shown in FIGS. 14 and 15.

Referring now to FIG. 15A, the operation of the forced drift circuit of FIG. 15 is illustrated graphically. The graph is divided into three sections. The first and last sections are normal operating conditions. The middle section represents a condition during detection when the vehicle is detected for a sufficient number of intervals to cause actuation of the incrementing concept used in the forced drift feature of the invention. The dots labeled *a* represent accumulated counts during successive counting intervals. When a vehicle approaches, the accumulated counts in the counting intervals will increase. As the vehicle leaves the detection field, the counts decrease back to a normal condition. The phantom lines *b*, *b'* and *b''* represent the reference count plus the threshold number at various stages in the sequence of successive counting intervals. During normal operation, line *b* is above the counts *a* by the threshold number. As the counts start to increase during the approach of the vehicle, the counts *a* are still below line *b*. The GTC flip-flop 420 shown in FIG. 12 is set. This indicates that the accumulated count exceeds the reference count. This prevents an immediate change in the reference count; however, the DET flip-flop 470 of FIG. 12 is not yet set. As soon as the counts increase to line *b*, DET flip-flop is set to indicate a detection. The OS output flip-flop 480 of FIG. 13 is then set to record the detection. During subsequent counting intervals, the forced drift circuit of FIG. 15 increments the reference register 10. Consequently, line *b'* increases since it represents the reference count plus the threshold number. This increase is in stepped fashion. Line *b'* is the line that determines whether or not the DET flip-flop 470 is set during a counting interval. As long as counts *a* are above line *b'* the DET flip-flop is set during each counting interval. When the accumulated counts a start to decrease, as the vehicle leaves, there is an intersection point between incremented line *b'* and the line defined by counts *a*. At this point, the accumulated counts *a* do not exceed the increased reference count and threshold represented by line *b'*. At this intersection point, the output OS has been set. Thus, the $\overline{OS}$ line is at a logic 0 at the input of gate 594 of FIG. 14. This produces a logic 1 in line 596 directed to gate 600. As soon as there is no setting of the DET flip-flop, the $\overline{DET}$ line 472 is also a logic 1. This produces a 0 in line 602. The GTC flip-flop is set; therefore, line 430 has a logic 1. The logic 0 in line 602 produces a logic 1 at the output of gate 604. This produces a logic 0 in the $\overline{PE}$ line 608. This logic 0, as previously mentioned, causes a gating of the accumulated count into the reference register. As soon as this happens, line $b''$ is forced upwardly above the intersection point by the threshold number. This is obvious since line $b''$ is the reference count plus the threshold number and the reference count has now been increased to the accumulated count at basically the intersection point. This prevents inadvertent further detection and allows the output OS flip-flop to be released. Thereafter, the accumulated counts *a* continue to decrease so that the counts in the accumulator are below the reference count at each successive interval. Consequently, the GTC flip-flop will not be set and each interval will cause gating of a lower count into the reference register 10. This continues until the normal condition is reestablished.

Figure 15B:
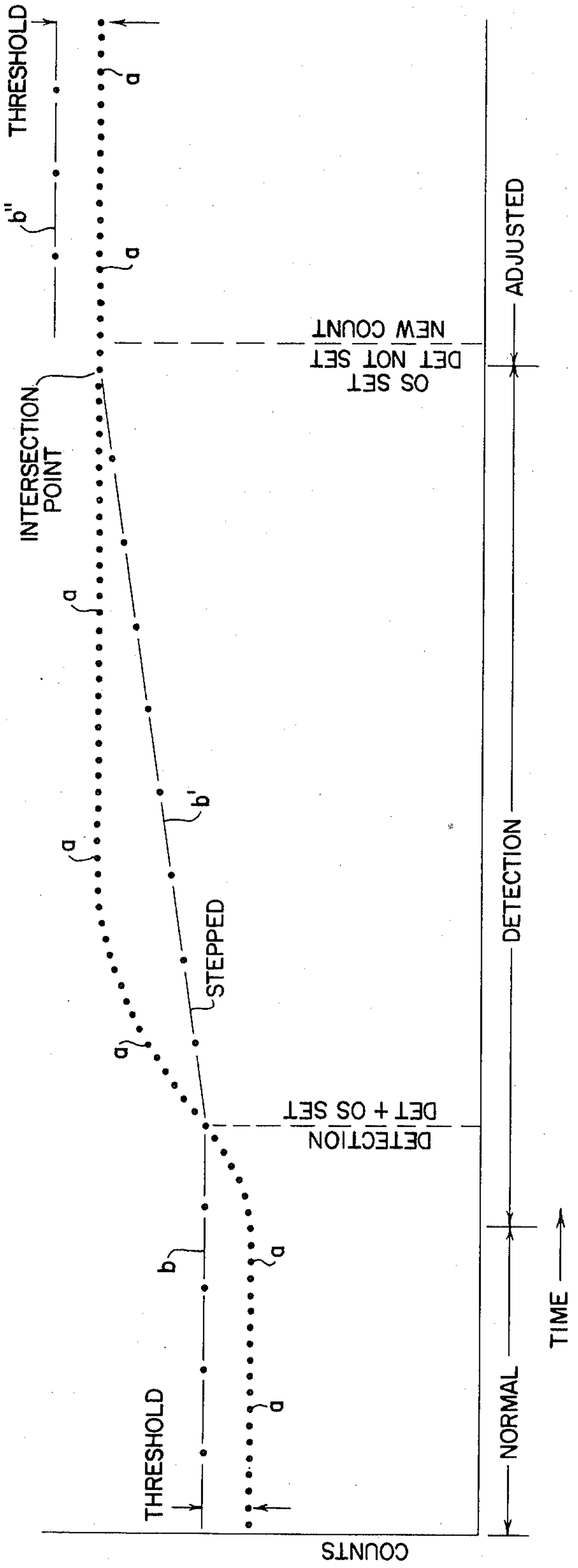

A situation where the vehicle is stalled or parked in the detection field is illustrated in FIG. 15*B*. When the vehicle approaches, the detection is made and the DET flip-flop 470 is set. Thereafter, the line $b'$ is incremented in stepped fashion since it represents the reference count, which is incrementing, plus the threshold number. After the detection, the accumulated counts *a* remain substantially the same because the vehicle is parked or stalled in a detection position. Consequently, the line $b'$ is extended and meets the line defined by counts *a* at the intersection point. When this happens, the DET flip-flop is not set during the counting interval. Since the output OS is set, the circuit of FIG. 14 operates in accordance with the operation explained in connection with FIG. 15A. Logic 0 input to gate 594 on the $\overline{OS}$ line and a logic 1 input to gate 600 on the $\overline{DET}$ line produces a logic in the $\overline{PE}$ line 608. When the next $t_1$ pulse occurs, the reference count is set to the accumulated count which is at a high level determined by the presence of a vehicle. This produces the line $b''$ which represents the count exceeding the new reference count by the threshold number. This produces an adjusted condition which is essentially the same as the normal condition. Line $b''$ remains above the higher counts a for subsequent detection of additional vehicles. When the stalled or parked vehicle leaves, the accumulated count during successive intervals will decrease. As previously mentioned, each decrease in the accumulated count below the reference count causes a gating of the accumulated count into the reference register. This causes a successive reduction in the reference count from the adjusted condition to the normal condition. This slope of line $b'$ can be adjusted to change the time required to "forget" a parked or stalled vehicle. Of course, the operation shown in FIG. 15B will also occur when any electrically conductive object causing a detection remains within the detection field.

Figure 15C:
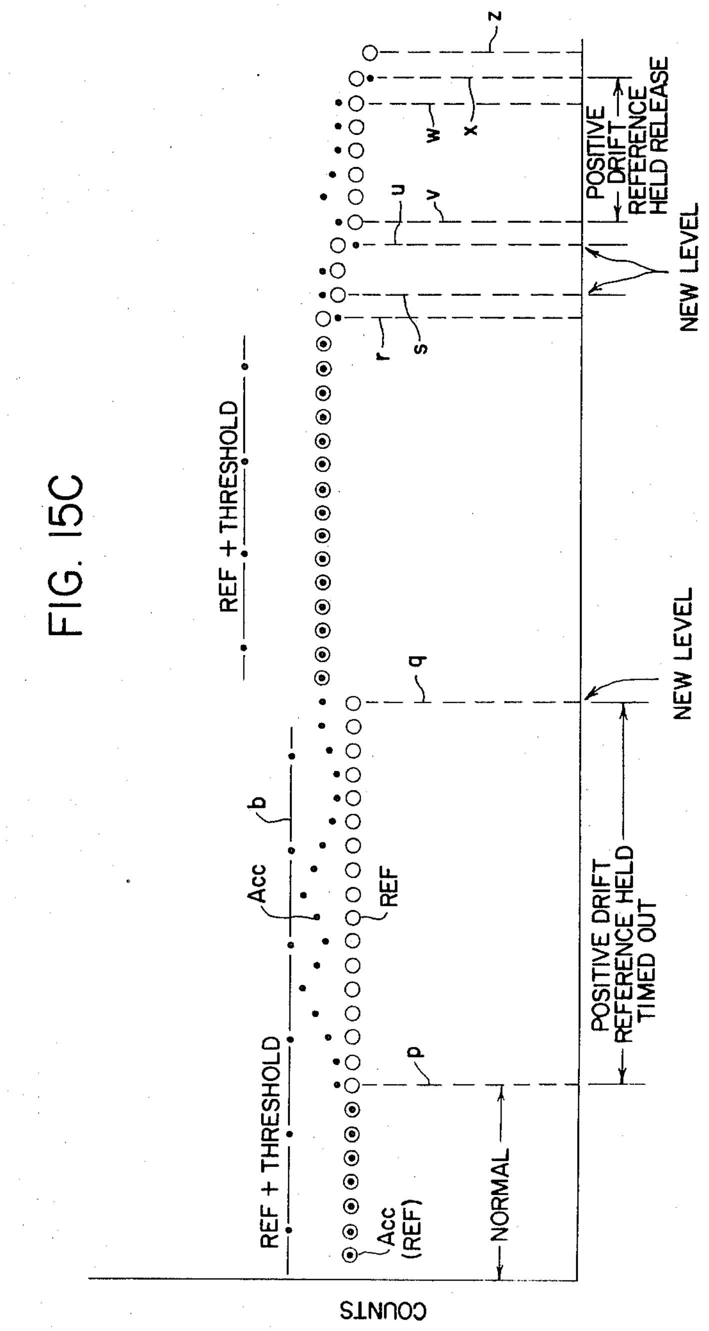

FIG. 15C shows the general operation of the positive drift circuit shown in FIG. 14. For the purpose of illustration, the reference count during each counting interval is shown as a circle and the accumulated count is shown as a dot. During normal operation, the count and reference are identical. After each counting interval, the accumulated count is gated into the reference register. The threshold plus reference line is represented as line *b*. At point *p*, the accumulated count exceeds the reference count. This causes the GTC flip-flop 420 of FIG. 12 to set, and a logic 1 appears in GTC line 430 of FIG. 12 and 14. The accumulated count has not reached the line *b;* therefore, line $\overline{OS}$ is a logic 1. Since the positive drift counter has not timed out, line $\overline{PD}$ is a logic 1. Consequently, line 596 is at a logic 0. This produces a logic 1 in line 602 which combines with the logic 1 on the GTC line and the $\overline{POC}$ line to provide a logic 1 in the $\overline{PE}$ line 608. This prevents gating of the accumulated count into the reference register; therefore, the reference counts remain the same. This is shown between points *p* and *q* in FIG. 13C. In this range, the accumulated counts can vary up and down without effect on the circuitry, as long as the accumulated count does not equal or drop below the fixed reference count.

At point *q*, it has been established that the slight upward drift is somewhat permanent and not caused by a detection. Thus, the positive drift circuit times out and line PD becomes a logic 1 in FIG. 14. This places a logic 0 in the $\overline{PD}$ line and causes a logic 1 in line 596. This logic 1 combines with the logic 1 on the $\overline{DET}$ line to produce a logic 0 in line 602. Consequently, the $\overline{PE}$ line is shifted to a logic 0 level. The next $t_1$ pulse then inserts the accumulated count into the reference register 10. The system then operates as shown between points *q* and *r* assuming that the accumulated counts remain equal at a slightly higher level.

At point *r*, the accumulated count is less than the reference count. Thus, the lower count is gated into the reference register as shown at point *s*. At point u the accumulated count is again less than the reference count. Again, the reference count is lowered to the accumulated count at point *v*. After point *v*, the accumulated count is greater than the reference count between points *v* and *w*. The positive drift feature then takes effect; however, at point *x* and before the positive drift feature times out, the accumulated count drops below the held reference count. At this time, the GTC flip-flop is not set and the GTC line 430 of FIG. 14 is at a logic 0. This lowers the level of $\overline{PE}$ line 608 and causes gating of the accumulated count into the reference register. This is shown at point z.

It is seen in FIG. 15C that the positive drift feature may be terminated before the positive drift counter has caused a timing out of the positive drift circuit. If not terminated, the timing out of this circuit causes termination within a given time.

It is noted in FIG. 15 that the counting interval is used to determine the rate at which the incrementing takes place. This lowest incrementing rate takes place when a logic 1 appears in line F (50 mS). When the interval is 100 mS, a logic 1 appears in line G. In this instance, the incrementing rate is twice as great as for the 50 mS interval. In a like manner, during the 200 mS interval when a logic 1 appears in line H, the incrementing rate is four times as high as that used in the 50 mS counting interval. This change in the rate is used to balance the real time that a vehicle is forgotten for a particular setting of presence time device 52. Since four times as many counts over reference will be created in 200 mS as the over counts in 50 mS, a four times rate incrementing attempts to balance the actual total time of forgetting a detected vehicle.

CREATION OF $\overline{GCP}$

FIGS. 16 and 17 relate to the creation of the $\overline{GCP}$ line during initial start-up of the digital detecting system A. A variety of circuits could be used to obtain this negative pulse when power is first applied to the system. In accordance with the illustrated embodiment of the invention, the circuit 680 includes a control capacitor 682 connected to the base of transistor 684 in a circuit including resistors 686, 687 and 688. Capacitor 685, in conjunction with resistor 687 determines the output pulse width from the one shot device 700, which may be a monostable multivibrator SN 74121 sold by Texas Instruments. When the 5 volt power suppy is first activated, capacitor 682 is charged through resistor 686. The emitter of transistor 684 rises with the voltage of this capacitor. when the voltage rises to a sufficient level, the B terminal of a single shot device 700, such as Schmitt trigger, is actuated to produce a positive pulse at the Q terminal. The $\overline{Q}$ terminal produces a single pulse of negative logic. When the 5 volt power supply is again removed, capacitor 682 discharges through the 5 volt terminal. This resets the single shot device 700 for another negative pulse on the $\overline{GCP}$ line when the power supply is again activated. As shown in FIG. 17, the delay between the power turn on point and the pulse of the single shot device 700 is approximately 150 mS. The pulse has a width of approximately 1 mS. Of course, a different width could be used without affecting the operation of the device as previously described.

POWER ON CONTROL CIRCUIT

Referring now to FIG. 18, the power on control circuit is illustrated. This circuit includes a POC flip-flop 710, which is a D-type flip-flop. The primary output line 710 ($\overline{POC}$) is connected to the $\overline{Q}$ terminal of the flip-flop. The S terminal is connected to the $\overline{GCP}$ line so that the general clearance pulse sets the flip-flop to a logic 1 when the system is first started. The Q terminal is connected to the line 712 (POC) which is directed to the input side of NAND gate 714. The other input of this gate is $t_2$ which appears during the decision mode or stage. Flip-flop 710 is clocked by line 716 connected to the output of gate 714.

The sequence of operation of the POC flip-flop 710 is illustrated in the accompanying chart. The general clearance pulse sets the flip-flop to a logic 1. The first $t_2$ pulse then clocks the $\overline{Q}$ logic to the Q output. This produces a logic 0 at one input for gate 714. The gate thus becomes latched with a logic 1 in line 716. Subsequent $t_2$ pulses have no effect on the circuit. The circuit becomes again active when a general clearance pulse $\overline{GCP}$ occurs upon start up of the system. The process is repeated during each start-up of the digital detecting system A. Consequently, a logic 1 generally appears in line 710 ($\overline{POC}$). This circuit assures that the system starts with a reference count representative of the actual starting condition.

OPERATION

The basic operation of the digital detecting system A as shown in FIG. 1 has been explained in conjunction with the various component circuits. As a brief recapitulation of this operation, when the system is first started, a $\overline{GCP}$ pulse is created by the circuit shown in FIG. 16. This resets most of the flip-flops in the various circuits to a logic 0 and resets certain of the counters to a logic 0 condition. Thereafter, a logic 1 is created in the power on control line $\overline{POC}$. The system is now in condition for operation in accordance with the logic flow chart illustrated in FIG. 2. When X and Y each equal a logic 1, gate 18 of FIGS. 1 and 11 allows the accumulator 12 to count the pulses $t_L$ which are indicative of the frequency of oscillator D. This is shown in block 60 of FIG. 2. During the counting, as shown in FIG. 11, comparator 14 compares the accumulator count to the reference count to produce a signal in line 16 when the two counters are equal. If the count during the counting interval equals the reference count, the next pulse of $t_L$ gates a logic 1 into the Q terminal of GTC flip-flop 420 shown in FIG. 12. If further counts are received from the loop oscillator, overflow counter 440 starts a counting operation. When the additional counts exceed the threshold number, four or eight, the DET flip-flop 470 is clocked to a logic 1 at the Q terminal. This indicates a vehicle detection by loop B. Consequently, the condition of flip-flops GTC (420) and DET (470) determines the relationship of the counts from the loop oscillator during the counting interval. This information is then used during the next decision mode. To stop a counting interval, as represented by line 62, the counting circuit of FIG. 9 counts the pulses on line $t_o$. According to the interval set, a $\overline{\text{RESET X}}$ is created at the end of the interval. This $\overline{\text{RESET X}}$ is then used in the circuit of FIG. 7 to change the logic of the X flip-flop to a logic 0. This produces the decision mode represented by $\overline{X}$ Y both having a logic 1. The counting interval has now been completed, the various counting flip-flops have been appropriately set, and the decision mode is ready to start. The first $t_o$ pulse then creates a $t_1$ pulse. The next $t_o$ pulse produces a $t_2$ pulse in about 100 $\mu$S, i.e., 0.1 mS. The $t_1$ and $t_2$ pulses determine the length of the decision mode to produce a sufficient time within the decision mode to accomplish the various decision steps indicated in FIG. 2. the first decision is whether or not the counts in the accumulator 12 exceeds the reference count by more than the threshold number. This is determined by the condition of the DET flip-flop 470 in FIG. 12. If this flip-flop is set to a logic 1 output, there has been a detection of a vehicle. If it is not set, there has been no detection.

Assuming that the DET flip-flop has not been set during the counting interval, line 66 is then applicable. The next decision is whether or not the accumulated count has exceeded the reference count. This is determined by the condition of the GTC flip-flop of FIG. 12. The truth table for the GCT flip-flop and the DET flip-flop is shown in FIG. 19. After the counting interval, the flip-flops have the designated logic for the three basic conditions listed. Assume now that the GTC and DET flip-flops have not been set during the counting operation. As seen in FIG. 19, this indicates that the count has not exceeded the reference count. This is represented by line 72 of FIG. 2. Referring to FIG. 13, if the OS flip-flop 480 were previously set to a logic 1 output, the logic 1 in $\overline{DET}$ line 472 will combine with a $t_2$ pulse to actuate gate 530. This will reset that output to a logic 0 to turn off the output line Z, if it were turned on. Referring now to FIG. 14, if GTC is at a logic 0, the output of gate 604 is a logic 1. This produces a negative logic in $\overline{PE}$ line 34. Consequently, the accumulator count is conditioned for clocking into the reference counter as shown in FIGS. 11 and 15. Since the $\overline{PE}$ line is a logic 0, the output of gate 670 in FIG. 15 is a logic 1. Thus, as soon as the decision stage is entered, a $t_1$ pulse is created, and a negative pulse occurs in clocking line 32 to clock the accumulator count into the reference counter. As shown in FIG. 14, when $\overline{PE}$ is shifted to a logic 0, gate 610 is inhibited to produce a logic 1 at one input of gate 612. Consequently, when the $t_2$ pulse occurs at the end of the decision stage, the positive drift counter 570 is reset. This concludes the functions exhibited in block 74 of FIG. 2. When a $t_2$ pulse appears, $\overline{t_2}$ shifts to a logic 0. This actuates gate 240 of FIG. 7 to shift the logic of the Y flip-flop 212. Consequently, the logic of the stage control flip-flops is 00, i.e. $\overline{X}.\overline{Y}$ = 1, and a transition stage has been entered. The next $t_o$ pulse actuates gate 232 to shift the stage control into the next transition condition. Thereafter, additional $t_o$ pulses shift the stage control into the accumulated count stage and the counting operation is repeated.

Assume now that the second condition of FIG. 19 occurs. In this condition, the count has exceeded the reference count; however, it has not exceeded the count sufficiently to set the DET flip-flop. This condition is represented by line 82 of FIG. 2 with the GTC flip-flop set to a logic 1 and the DET flip-flop set to a logic 0 during the counting interval. The $\overline{\text{RESET X}}$ pulse then starts the decision mode, as previously described. Referring to FIG. 14, if the positive drift counter has not started operation, a logic 0 appears in line 596. This produces a logic 1 in line 602. This combined with the logic 1 of GTC produces a logic 1 in the $\overline{\text{PE}}$ line. Consequently, the accumulator can not be gated to the reference counter. Two logic 1 signals are thus directed to gate 610 which releases the positive drift counter for counting the 400 mS pulses. This is represented by block 84 of FIG. 2. If the positive drift counter has timed out to produce a logic 1 in the PD line of FIG. 14, a logic 1 appears in line 596. This, combined with the logic 1 of the $\overline{\text{DET}}$ line, produces a logic in line 602. When this happens, the functions of block 74 of FIG. 2 are then performed. Of course, the reset output function of block 74 is not needed in this instance. The positive drift circuit does not time out until more than one counting interval has been created without a detection. Thus, the OS flip-flop will be reset to a logic 0 during the operation of positive drift circuit.

Assuming now that there is a vehicle detection, the third condition of FIGS. 19 will exist after the counting interval. Both the GTC and DET flip-flops will be set to a logic 1 output. The next logic function is indicated by block 92. The first step is to determine whether or not the output has been set, i.e., flip-flop 480 of FIG. 13 has been set to a logic 1 output. A detection in the previous counting cycle would have set the output flip-flop 480. Assuming first that the output flip-flop has not been set, line OS has a logic 0 and line $\overline{\text{OS}}$ has a logic 1. Referring to FIG. 13, the $t_2$ pulse of the decision stage will combine with a logic 1 of the DET line to produce a logic 0 in line 508. This resets the DET flip-flop at the end of the decision stage. A logic 1 appears in line 512 to combine with the logic 1 conditions of lines 500 and 710 to produce a logic 0 in line 522. This clocks the OS flip-flop 480 to a logic 1. In addition, a logic 0 in the $\overline{\text{DET}}$ line (472) produces a logic 1 in output line 602 of gate 600, shown in FIG. 14. This combines with a logic 1 in the GTC line 430 to produce a logic 1 in the $\overline{\text{PE}}$ line. This enables the positive drift counter as represented by block 102 of FIG. 2. The last function of line 94 is the resetting of the forced drift counter best shown in FIG. 15. With logic 1 on $\overline{\text{OS}}$, counter 620 is held in its reset condition. The decision stage is then terminated by the $t_2$ pulse as previously mentioned.

When in the third condition of FIG. 19, line 110 of FIG. 2 is actuated when the output flip-flop 480 is set, i.e., a logic 1 appears in the OS line and a logic 0 appears in the $\overline{\text{OS}}$ line. As shown in FIG. 14, a logic 0 in the $\overline{\text{OS}}$ line produces a logic 1 at the output of gate 610. This provides a logic 1 in the reset line 616 to reset the positive drift counter 570. This function is represented by block 112 of FIG. 2. The forced drift counter shown in FIG. 15 is released by a logic 0 in the $\overline{\text{OS}}$ line at line 622. This is represented by block 114 of FIG. 2. The further operation of system A is now determined by the forced drift circuit shown in FIG. 15. If during the decision mode the forced drift counter 620 has the A stage in the reset state, i.e., a logic 0 in the line $A_{FD}$, line 118 of FIG. 2 is actuated. In other words, the $t_2$ pulse terminates the decision mode without any action being taken. This is continued until the forced drift oscillator 50 has caused a logic 1 output in line 662 of gate 660. When this happens, line 648 sets the A portion of counter 620. A logic 1 then appears in the $A_{FD}$ line and a logic 0 appears in line $\overline{A_{FD}}$. As previously described, a logic 0 in the $\overline{A_{FD}}$ line causes an increment in the reference counter. The $\overline{\text{PE}}$ line remains at a logic 1 in each decision mode when there is a detection. When the forced drift counter is set, the reference counter is incremented. This incrementing continues as long as there is a detection as indicated by line 90 of FIG. 2. The upward incrementing of the reference counter causes the system A to forget a vehicle remaining in the field of effect of detecting loop B. As soon as the reference counter has been incremented a sufficient amount, the second condition of FIG. 19 occurs. When the vehicle finally leaves the field of influence, even with a higher reference count, the first condition of FIG. 19 exists. The count does not exceed the incremented reference count; therefore, the new count is gated directly into the reference counter for processing.

The operation of the circuit as shown in FIG. 2 is the same for a pulse mode of operation; however, in this mode of operation, the output line is held for a set period of time by the circuits illustrated in FIGS. 9 and 13. After a detection, the output signal is removed by the $\overline{\text{100 mS}}$ line of FIG. 9. Flip-flop 550 is released to produce a logic 1 in line 556. This removes the output signal in line Z.

MODIFICATIONS OF THE PREFERRED EMBODIMENT

FIGS. 20–26 represent certain modifications in the preferred embodiment of the present invention which relate primarily to the arrangement for setting the GTC flip-flop and the DET flip-flop. The first flip-flop is set whenever the count of the pulse train $t_L$ during a counting interval is only slightly different than the reference count. DET flip-flop is set when the difference between the accumulated count and the reference count is different from the reference count by an amount exceeding the threshold. Of course, the concept of exceeding the threshold is not limiting. The threshold may be equaled or exceeded according to the process of assigning the threshold number.

Figure 20:
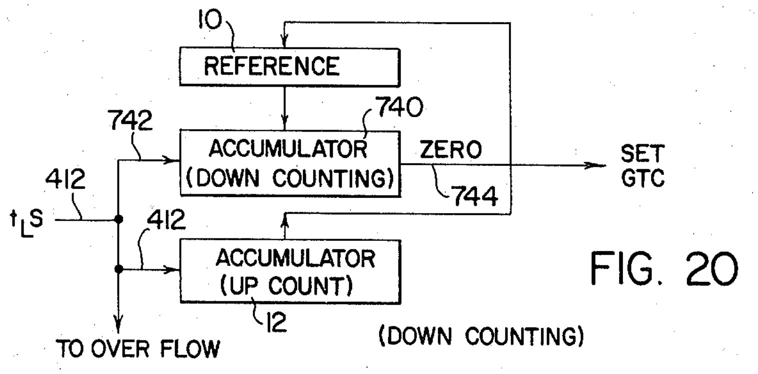

Referring now to the modification shown in FIG. 20, a down counter type accumulator 740 is counted down during a timing interval by the $t_L$S pulses in line 412. The reference count in register or counter 10 is selected in accordance with the preferred embodiment of the invention by the count accumulated in the accumulator 12 during the counting interval. When the down counter 740 is down counted to zero, line 744 is actuated to set the GTC flip-flop. The overflow circuit is then operated by the $t_L$S line to ultimately set the DET flip-flop when the additional counts exceeds the zero down counting of accumulator 740 by a number exceeding the threshold number. In operation, the reference count is gated into the down counter 740 during the decision mode. Consequently, the reference count is shifted or gated into the accumulator 740 prior to the counting interval. During the counting interval, the reference count is down counted until the zero point is reached. This indicates that the count during the counting interval has equalled the reference count. The GTC flip-flop is then set on the next count, as explained in the preferred embodiment. In this manner, a down counter can be used instead of a comparator as used in the preferred embodiment of the invention. Of course, other variations could be provided for using a down counter in the counting interval.

Figure 21:
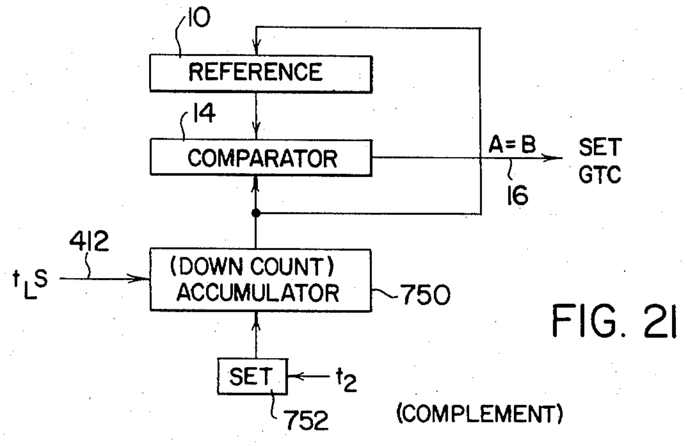
Figure 22:
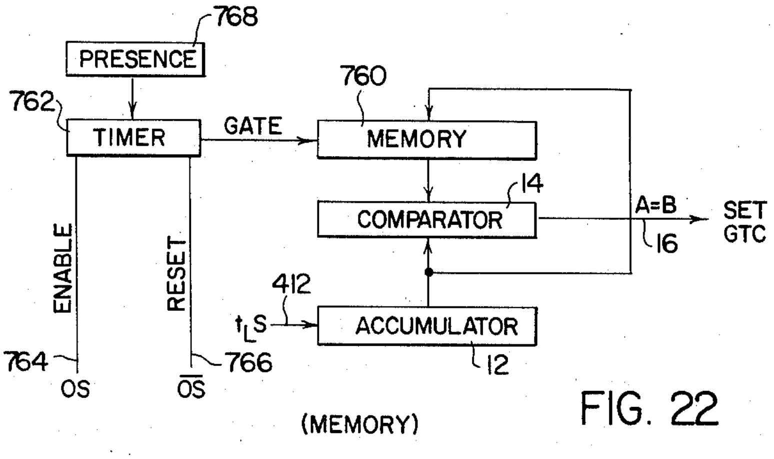

Another modification using a down counter is illustrated in FIG. 21. Down counting accumulator 750 is set to all ones by the setting gate 752 upon a $t_2$ pulse at the end of the decision mode. Consequently, the pulses during the counting interval on lines 412 down count the accumulator from its all logic 1 set condition. The reference count in reference register 10 includes a complement of the actual accumulated count. This complement count is inserted into the reference counter in accordance with the concepts of the preferred embodiment. Comparator 14 compares the count complement in register 10 with the condition of the down counter 750. When they are equal, a signal is received in line 16, as previously described. Thereafter, the operation of the device is in accordance with the preferred embodiment of the invention. After the counting interval, the condition of the accumulator 750 can be gated into the reference register 10 in the same manner as the accumulated count is gated into the reference counter in the preferred embodiment.

In a preferred embodiment of the invention, the reference count is gated into a counter so that it may be incremented during the forced drift feature of the invention. Modifications shown in FIG. 22 utilize a memory unit 760 which can receive the accumulated count to produce a reference count. The system operates in accordance with the preferred embodiment of the invention except in the area of the forced drift feature. The memory unit can not be incremented. A force drift type of feature can be employed in this modification to "forget" a vehicle parked or stalled within the detection field. Various arrangements could be used for this purpose; however, in accordance with the illustrated embodiment of this modification, the timer 762 is enabled by line 764 and reset by line 766. The enabling line is controlled by the OS line and the reset line is controlled by the OS line. Consequently, when the output is set and a logic 1 appears in the OS line, timer 762 is enabled. When the timer times out, a gating pulse is directed to memory 760 to gate the accumulator count into the memory. This shifts the reference count of the memory to the higher level and eliminates the parked or stalled vehicle, similar to the concept of the forced drift feature. Whenever the output is not set, the timer is reset by line 766 since a logic 1 appears in the OS line. To control the length of time before gating the accumulator count into the reference count when the output is set, there is a presence adjusting device 768. This controls the time delay of timer 762. In this embodiment, after the output has been set for a time determined by the timer 762, the count accumulated in the counter during a counting interval is gated into the memory unit 760. This provides the forced drift feature in a system utilizing a memory unit, instead of a counter register.

Figure 23:
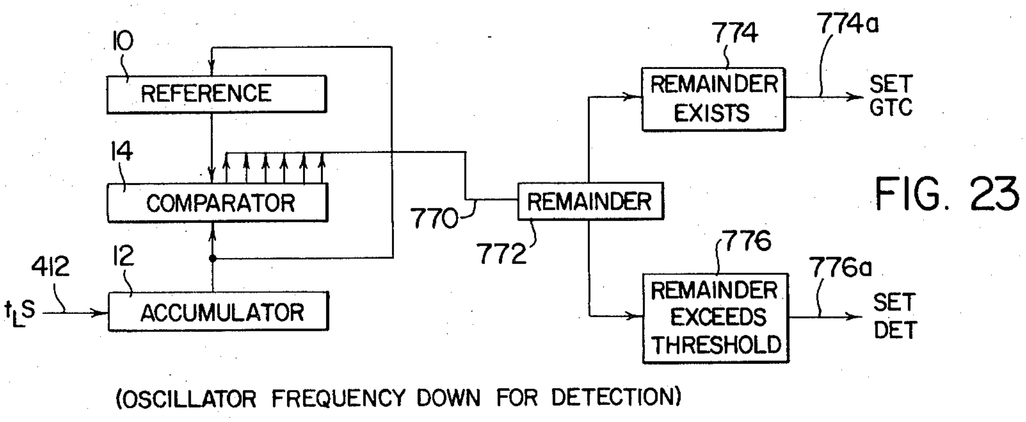

In some installations, it may be possible to provide an oscillator circuit wherein the frequency decreases for a detection. In accordance with the invention, this situation can be accommodated in various arrangements. One of these arrangements is schematically illustrated in FIG. 23. After the counting interval, comparator 14 will have a remainder after a detection. Consequently, line 770 directs the remainder to a remainder decoder 772. This decoder has two outputs. The first output indicates whether or not a remainder exists as indicated by block 774. If so, a signal is created in line 774*a* to set the GTC flip-flop. If the remainder indicated by decoder 772 is greater than the threshold number, a signal is created as indicated by block 776 having an output 776*a* for setting the DET flip-flop. In this manner, a detection is noted by the remainder within the comparator 14. Of course, other arrangements could be devised for decoding the remainder between the reference count and the accumulated count.

Figure 24:
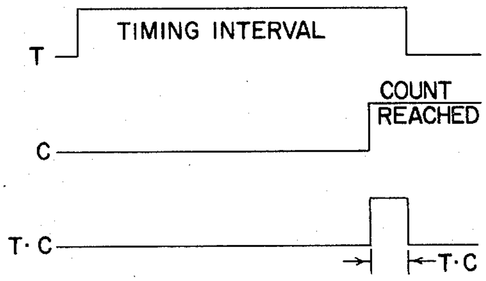
Figure 25:
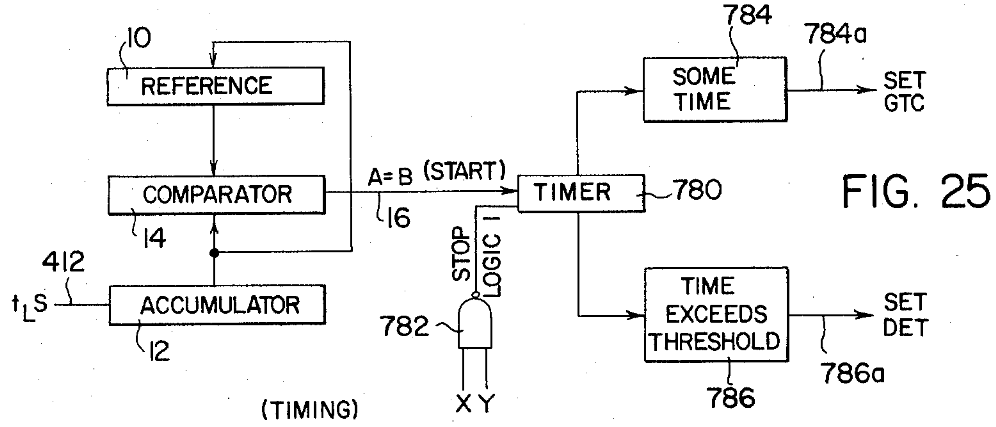

FIGS. 24 and 25 illustrate still a further modification of the invention. In accordance with the graph shown in FIG. 24, a timing interval is illustrated by graph T. When the reference count has been reached, line C is shifted. The logic ANDing is shown in the bottom line. This produces a signal representing the time remaining in the timing or counting interval after the reference count has been reached. The GTC and DET flip-flops can be controlled by this time. An arrangement for accomplishing this function is illustrated in FIG. 25. Timer 780 is started by line 16 when the accumulated count equals the reference count as determined by comparator 14. The timer is stopped when a logic 1 appears at the output of NAND gate 782. This occurs when either X or Y are at a logic 0. Consequently, logic 1 appears at the output of gate 782 at the end of the counting interval. This stops timer 780. The time accumulated within timer 780 is then decoded. If there has been some time accumulated, a circuit indicated by block 784 produces an output signal in line 784*a*. This sets the GTC flip-flop. If the accumulated time exceeds a threshold time, instead of counts, a circuit indicated by block 786 produces a signal in line 786*a*. This sets the DET flip-flop. Otherwise, the circuit operates in accordance with the preferred embodiment of the invention. The difference is that the control is by the time instead of by actual counts. Of course, other arrangements could be used for accomplishing this particular modification of the preferred embodiment of the invention.

Figure 26:
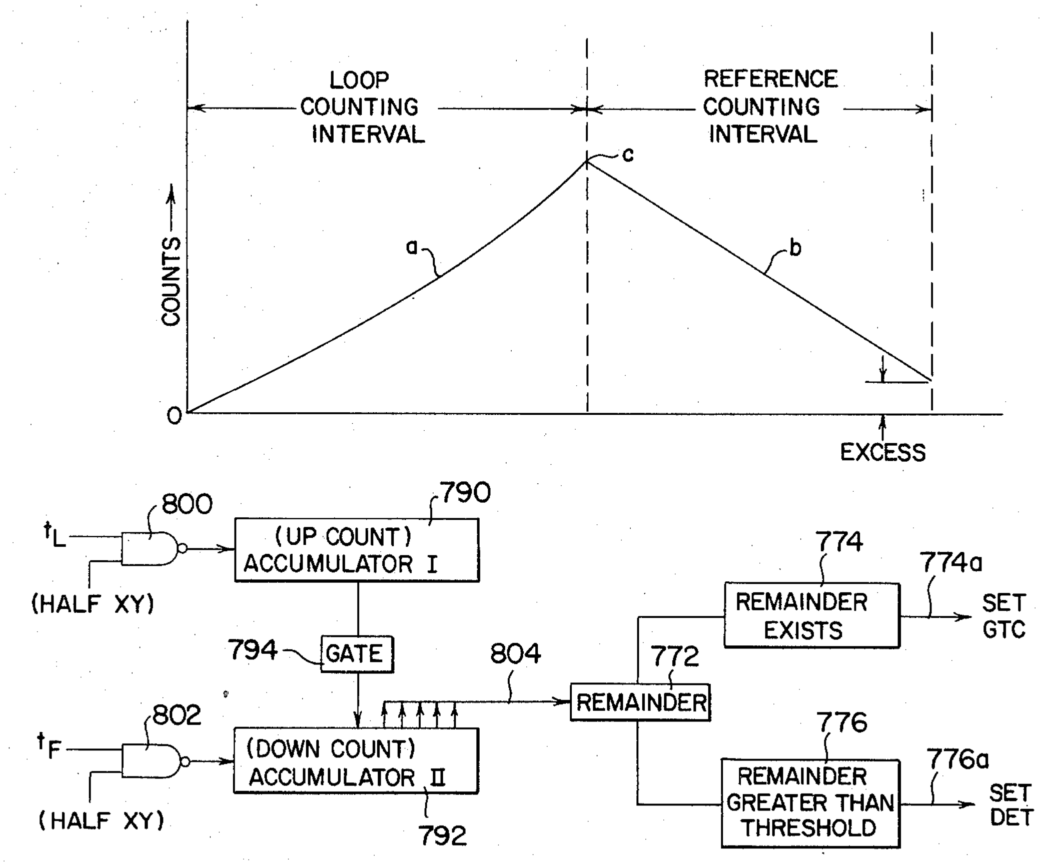

Another modification of the preferred embodiment is illustrated in FIG. 26 wherein the upper chart indicates that the counting interval is divided into two sections. The first is represented by line a and the second is represented by line *b*. The apex *c* is the transition from first to the second counting feature. Line a represents counting by the loop oscillator. Line b represents an accumulator counting down from the count accumulated during the loop counting interval. The excess remaining at the end of line *b* represents the difference between the representative count and a reference count. This excess can be used to control the circuitry illustrated in the preferred embodiment of the invention. Various arrangements could be adopted for using this concept; however, one such arrangement is illustrated in the lower part of FIG. 26. The upcounting accumulator 790 and a down counting accumulator 792 are connected by a gate 794. Gate 800 directs pulse train $t_L$ to an accumulator 790 during the first part of the counting interval. This is represented by line a in FIG. 26. At the apex *c*, gate 794 gates the count in accumulator 790 into the accumulator 792. Thereafter, a fixed frequency $t_F$ is gated by gate 802 to down count the accumulator 792. The remainder in accumulator 792 is directed by line 804 to the remainder decoder 772. This decoder is similar to the decoder shown in FIG. 23. The peripheral circuitry for this decoder is also similar to that figure; therefore, it need not be further explained.

Figure 27:
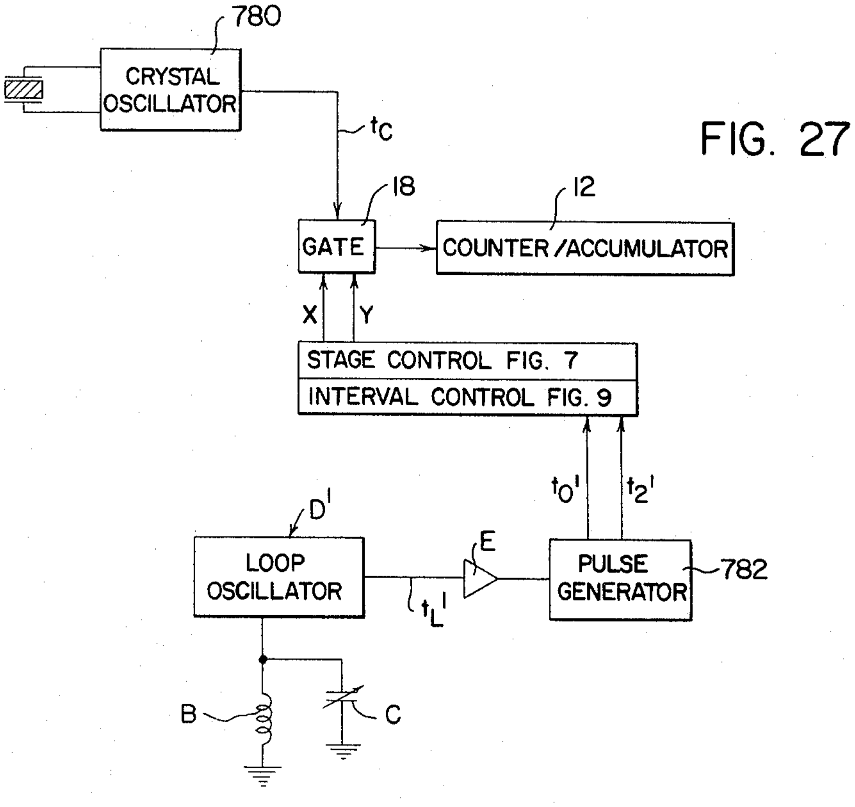
Figure 28:
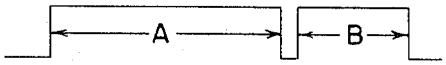

A still further modification of the preferred embodiment of the invention is illustrated in FIGS. 27 and 28. In the preferred embodiment, the variable pulse train $t_L$ from loop oscillator D is counted for a known time to give an accumulated count indicative of the loop inductance during operation of detector system A. A similar accumulated count could be obtained by counting a pulse train having a fixed frequency for a counting interval having a duration controlled by the inductance of loop B. A system for accomplishing this operation is shown in FIG. 27. A crystal controlled oscillator 780 has a pulse train output $t_C$ directed to the input of gate 18 in a manner similar to the $t_L$ pulse train shown in FIGS. 1 and 11. The *x*, *y* inputs to gate 18 are controlled by a loop oscillator D' having a $t'_L$ pulse train output. Oscillator D' is constructed to produce a decreased output frequency when an electrically conductive object or mass is detected by loop B. This response is the reverse of oscillator D used in the preferred embodiment. Pulse train $t'_L$ has a frequency basically controlled by the inductance of loop B; therefore, by providing a pulse generator 782, similar to the generator of FIG. 6 with the introduction of the $t'_L$ pulse train into line 154, $t'_0$ and $t'_2$ pulses, corresponding in function to the $t_0$ and $t_2$ pulses of the preferred embodiment, can be created to coact with the circuitry of FIGS. 7 and 9. In this manner, the time when both *x* and *y* are at a logic 1 is controlled by the frequency of $t'_L$. Accumulator 12 counts the constant frequency pulse train $t_C$ for a time controlled by the output frequency of oscillator D'. The remainder of the circuitry in the preferred embodiment is used in the modification shown in FIG. 27 to complete the system. FIG. 28 illustrates the operation of this modification wherein counting intervals A, B are changed to create different counts when the frequency of oscillator D' is changed by variations in the inductance of loop B.

It is seen that several modifications can be employed in counting the frequency of the pulse train from the loop oscillator D and comparing it to a reference count or frequency. Other further modifications can be developed without departing from the intended spirit and scope of the present invention.

Having thus described my invention, I claim:

1. A digital detecting system for generating an output signal when an electrically conductive mass comes within the field of effect of a loop, said system comprising: means for creating a pulse train, the number of pulses in said train being controlled primarily by the presence of said mass in the field of effect of said loop; means for generating a first signal representative of the average of the number of pulses in said pulse train; means for generating a second signal representative of a reference count; means for comparing said first and second signals; and, means for creating an output signal when said first signal differs from said second signal.

2. A digital detecting system for creating an output signal when an electrically conductive object comes within the field of effect of a loop, said system comprising; means for creating a pulse train having a frequency controlled primarily by the inductance of said loop; means for counting the pulses of said pulse train for a selected time interval to produce a count generally representative of the average frequency of said pulse train during said time interval; means for creating a reference count; means for comparing said representative count with said reference count; and means for creating said output signal when said representative count differs from said reference count by at least a given amount in a selected numerical direction.

3. A system as defined in claim 2 including means for changing said given amount.

4. A system as defined in claim 2 including means for changing said time interval.

5. A system as defined in claim 2 including means for creating a succession of said time intervals and means for controlling said output signal as long as said representative count exceeds said reference count by at least said given amount during such successive time interval.

6. A system as defined in claim 5 including means for maintaining said output signal and means for increasing said reference counts while said output signal is being maintained.

7. A system as defined in claim 6 wherein said increasing means includes means for incrementing said reference count periodically while said output signal is being maintained.

8. A system as defined in claim 7 including means for creating a succession of time intervals at a given rate and wherein said incrementing means includes means for creating incrementing pulses at a rate substantially less than said given rate.

9. A system as defined in claim 6 wherein said means for creating a reference count includes means for making said reference count correspond to a representative count when a representative count fails to exceed a reference count during a time interval and while said output is being maintained.

10. A system as defined in claim 2 including means for creating a succession of said time intervals.

11. A system as defined in claim 10 wherein said means for counting said pulses of said pulse train includes an accumulator counter and said means for creating a reference count includes a count register.

12. A system as defined in claim 11 wherein said comparing means includes a means for comparing the count in said register and the count created in said accumulator during a time interval.

13. A system as defined in claim 12 including means for inserting the count of said accumulator during a given time interval into said reference register after said given time interval.

14. A system as defined in claim 13 including means for actuating said inserting means in response to said representative count differing from said reference count during a time interval in the numerical direction opposite to said selected numerical direction.

15. A system as defined in claim 13 including means for actuating said inserting means in response to said representative count equalling said reference count.

16. A system as defined in claim 13 including means for actuating said inserting means in response to said representative count differing from said reference count in said selected numerical direction by an amount less than said given amount.

17. A system as defined in claim 16 including a time delay means for delaying actuation of said inserting means for more than one time interval.

18. A system as defined in claim 10 wherein said reference count creating means includes a memory unit and means for inserting a representative count during one time interval into said memory unit for use as a reference count during a successive time interval.

19. A system as defined in claim 18 including means responsive to creation of said output signal for inhibiting said inserting means for a period of time, and means for controlling said period of time.

20. A system as defined in claim 10 wherein said output creating means includes a timer having means for starting and a signal when a selected time has been reached; means for creating said output signal in response to said timer signal; means for actuating said starting means when said representative count reaches said reference count in a given time interval and means for deactuating said timer starting means when said given time interval is completed whereby said output signal will be created when said timer is operated for a time exceeding said selected time.

21. A system as defined in claim 10 wherein said pulse counting means includes a down counter; means for setting said down counter to a known count prior to a given time interval; said reference count creating means includes a means for receiving a count and means for inserting a new count from said down counter into said count receiving means after a time interval prior to said given time interval; and, said comparator means including means for comparing the count of said down counter to said new count during said given time interval.

22. A system as defined in claim 1 wherein said output creating means includes means for creating an output signal when said reference count exceeds said representative count by at least a selected number of counts.

23. A digital detecting system for creating an output signal when an electrically conductive object comes within the field of effect of a loop, said system comprising: means for creating a pulse train having a frequency controlled primarily by the inductance of said loop; means for creating a reference count; a down counter means responsive to input pulses for counting down from a number loaded into said down counter means; means for loading said reference count into said down counter; means for directing said pulse train as an input pulse to said down counter means for a selected time interval; and means active after said time interval for creating said output signal when said down counter has counted down from said reference count to a number exceeding said reference count.

24. A digital detecting system for creating an output signal when an electrically conductive mass comes within the field of effect of a loop, said system comprising: means for creating a reference count; means for creating a binary count representative of the inductance of said loop during a selected time interval after creation of said reference count; and means for creating said output signal when said representative count during said selected time interval differs from said previously created reference count by at least a selected number.

25. A digital detecting system as defined in claim 24 including means for creating a succession of said time intervals and said means for creating a reference count includes: means for creating a count insertion signal when said representative count does not exceed said reference count by at least said selected number and means responsive to said count insertion signal for setting said reference count to said representative count of one time interval for use in the next time interval.

26. A digital detecting system as defined in claim 25 wherein said count insertion signal creating means includes a flip-flop having a first state corresponding to insertion signal when said representative count fails to exceed said reference count during a given time interval.

27. A digital detecting system as defined in claim 25 including a time delay means for delaying creation of said count insertion signal when said representative count exceeds said reference count by less than said selected number in a succession of said time intervals.

28. A digital detecting system as defined in claim 27 wherein said time delay means includes a counter having a timed out output after a time greater than at least two of said time intervals and means responsive to said timed out output for allowing creation of said count insertion signal.

29. A digital detecting system as defined in claim 28 including means for enabling said counter when said representative count exceeds said reference count by less than said selected number.

30. A digital detecting system as defined in claim 24 including means for creating a succession of said time intervals and means for incrementing said reference count when said representative count exceeds said reference count in a time interval.

31. A digital detecting system for creating an output signal when an electrically conductive mass comes within the field of effect of a loop, said system comprising: an oscillator circuit having a pulse train output with a frequency which is controlled by the inductance of said loop and wherein said output pulse train has a frequency that increases at least a given amount when one of said objects enters the field of effect of said loop; means for counting the pulses of said pulse train over a selected time interval to obtain a count representative of the inductance of said loop; means for creating a reference count; and means for creating said output signal when said representative count exceeds said reference count by at least a selected number.

32. A digital detecting system for creating an output signal when an electrically conductive object comes within the field of effect of a loop, said system comprising: means for creating a succession of closely spaced, uniform time intervals; means for creating a pulse train having a frequency controlled primarily by the inductance of said loop; means for counting the pulses of said pulse train during each of said time intervals to produce a count generally representative of the inductance of said loop, said count having a first general range when at least one of said objects is within said field of effect of said loop and a second general range when no object is in said field of effect of said loop; and means for creating said output signal when said representative count is in said first range.

33. A digital detecting system for creating an output signal when an electrically conductive object comes within the field of effect of a loop, said system comprising: means for creating a succession of closely spaced, uniform time intervals; means for creating a pulse train having a frequency controlled primarily by the inductance of said loop; means for counting the pulses of said pulse train during each time interval to produce a count generally representative of the inductance of said loop; means for creating a reference count; means for comparing said representative count and said reference count; a first device having first and second conditions; means for shifting said first device into said first condition when said representative count differs from said representative count in a given interval by a given number of counts; and means responsive to said first condition of said first device for creating said output signal.

34. A system as defined in claim 33 wherein said reference count creating means includes means for storing a count and means for inserting a representative count of a time interval into said storing means for use in subsequent time intervals.

35. A system as defined in claim 34 including means for inhibiting said inserting means for a time exceeding one of said time intervals when said output signal is created.

36. A system as defined in claim 34 including a second device having first and second conditions, and means for shifting said second device into its first condition when said representative count exceeds said reference count during said given time interval.

37. A system as defined in claim 36 including means for causing said storage means to store a representative count upon receipt of a storage signal and means responsive to said first device being in its second condition and said second device being in its first condition for creating said storage signal.

38. A system as defined in claim 37 including means for delaying said storage signal for a delay time at least more than one time interval, and overriding means for allowing said storage signal in response to shift of said second device into said second condition during delay time.

39. A system as defined in claim 36 including means for causing said storage means to store a representative count upon receipt of a storage signal and means responsive to said first device being in its second condition and said second device being in said second condition for creating said storage signal.

40. A digital detecting system for creating an output signal when an object comes within a detection field, said system includes: means for creating a series of closely spaced counting intervals; means for creating a pulse train having pulses occurring at a frequency which changes when one of said objects comes within said detection field; means for counting said pulses during each of said counting intervals to provide a count representative of the average frequency during each counting interval; means for creating a reference count prior to each counting interval; means for comparing said representative count during a given interval with said reference count existing during said given interval; means for creating a control signal when said representative count differs from said reference count during said given interval by a given amount; and, means for creating said output signal in response to said control signal.

41. A system as defined in claim 40 wherein said means for creating a reference count includes means for storing said reference count and means for inserting a representative count into said storing means for use during said given interval.

42. A system as defined in claim 41 including means creating a first signal when said output signal is created; and inhibiting means responsive to said first signal for inhibiting said inserting means.

43. A system as defined in claim 42 including means for controlling the time during which said inhibiting means inhibits said inserting means.

44. A system as defined in claim 43 including means for changing said reference count while said inhibiting means is inhibiting said inserting means.

45. A method of detecting a vehicle and creating an output signal when said vehicle comes within a detection field, said method comprising the steps of:

a. creating a series of closely spaced counting intervals;
b. creating a pulse train having pulses occurring at a frequency which changes when one of said vehicles comes within said detection field;
c. counting said pulses during each of said counting intervals to provide a count representative of the average frequency during each counting interval;
d. establishing a reference count for a given counting interval by using a representative count from a prior interval;
e. determining the amount by which said representative count differs from said reference count in said given interval; and,
f. creating said output signal when said amount reaches a given level.

46. A method as defined in claim 45 including the additional step of:

g. inhibiting said establishing step for a succession of counting intervals when said output signal is created so that said reference count during said successive intervals remains at a controlled level.

47. A method as defined in claim 46 including the additional step of:

h. changing said controlled level in incremental steps during said successive intervals.

48. A method as defined in claim 46 including the additional step of:

h. discontinuing said inhibiting step after a preselected time.

49. A method as defined in claim 48 including the additional step of:

i. changing said controlled level in incremental steps during said preselected time.

50. A digital detecting system for creating an output signal when an object comes within a detection field, said system including: means for creating a series of closely spaced, counting intervals; means for creating a pulse train having pulses occurring at a frequency which changes when one of said objects comes within said detection field; means for counting said pulses during each of said counting intervals to provide a count representative of the average frequency during each count interval; means for creating a reference count prior to each counting interval; means for comparing said representative count during a given interval with said reference count existing during said given interval; means for creating a control signal when said representative count differs from said reference count during said given interval by a given amount; means for creating said output signal in response to said control signal; said means for creating a reference count including means for converting a prior representative count into a reference count for subsequent use.

51. A system as defined in claim 50 including means for retaining said reference count constant for a number of successive intervals, and means responsive to said representative count differing from said reference count by less than said given amount for actuating said retaining means.

52. A digital detecting system for creating an output signal when an object comes within a detection field, said system including: means for creating a pulse train having pulses occurring at a frequency which changes when one of said objects comes within said detection field; means for determining the frequency of said pulse train at successive intervals; means for establishing a reference frequency prior to each interval; means for comparing said determined frequency during a given interval with said reference frequency during said given interval; means for creating a control signal when said representative frequency differs from said reference frequency during said given interval by a given amount; and, means for creating said output signal in response to said control signal.

53. A digital detecting system for creating an output signal when an electrically conductive object comes within the field of effect of a loop, said system comprising: means for creating a pulse train having a frequency controlled primarily by the inductance of said loop; means for counting the pulses of said pulse train for a selected time interval to produce a count generally representative of the average frequency of said pulse train during said time interval; means for creating a reference count; means for comparing said representative count with said reference count; means for creating said output signal when said representative count differs from said reference count by at least a given amount in a selected numerical direction; meansd for creating a succession of time intervals; and means for maintaining said output signal as long as said representative count differs from said reference count by said given amount.

54. A system as defined in claim 53 including means for increasing said reference count while said output signal is maintained.

55. A digital detecting system for creating an output signal when an electrically conductive object comes within the field of effect of a loop, said system comprising: means for creating a pulse train having a frequency controlled primarily by the inductance of said loop; means for creating a count representative of the average frequency of said pulse train during a counting interval; means for creating a reference count; means for comparing said representative count with said reference count; and, means for creating said output signal when saisd representative count differs from said reference count by a given amount.

56. A system as defined in claim 55 wherein said representative count creating means includes a means for counting a fixed frequency for said counting interval and means for varying the time of said counting interval by the frequency of said pulse train.

57. A digital detector system for creating an output signal when an electrically conductive vehicle comes within the field of effect of a loop mounted adjacent a roadway, said system comprising: a loop oscillator for creating an output pulse train having a frequency controlled by the inductance of said loop; digital means for creating digital representation of the frequency of said pulse train; means for comparing said digital representation with a digital reference; and means for creating said output signal when said digital representation differs from said digital reference by a given digital amount.

58. A digital system as defined in claim 57 wherein said digital representation is a representative count, said digital reference is a reference count and said digital amount is a number.

59. A digital detecting system for creating an output signal when an electrically conductive object comes within the field of effect of a loop, said system comprising; means for creating a pulse train having a frequency controlled primarily by the inductance of said loop; means for counting the pulses of said pulse train for a selected time interval to produce a count generally representative of the average frequency of said pulse train during said time interval; means for creating a reference count; means for comparing said representative count with said reference count; and means for creating said output signal when said representative count differs from said reference count a given amount in a selected numerical direction.

60. A digital detecting system for generating an output signal in response to the presence of an electrically conductive mass within the field of effect of a loop, said system comprising: means for generating a first signal having a frequency controlled by the presence of said mass in the field of effect of said loop; means controlled by said first signal for creating a first count signal representative of the time base average of the frequency of said first signal; means for generating a second count signal representative of a reference count; means for comparing said first and second count signals; and, means for generating an output signal when said first count signal differs from said second count signal.

61. A digital detecting system as defined in claim 60 wherein said output signal generating means generates said output signal when said first count signal differs from said second count signal by at least a selected value.

62. A digital detecting system as defined in claim 60 wherein said output signal generating means generates said output signal when said first count signal exceeds said second count signal by at least a selected value.

* * * * *